(12) United States Patent
Ohnishi et al.

(10) Patent No.: US 10,193,662 B2
(45) Date of Patent: Jan. 29, 2019

(54) ROUTER, TERMINAL, AND CONGESTION CONTROL METHOD FOR ROUTER AND TERMINAL

(71) Applicant: Panasonic Intellectual Property Corporation of America, Torrance, CA (US)

(72) Inventors: Ryota Ohnishi, Osaka (JP); Takahiro Yoneda, Osaka (JP); Eiichi Muramoto, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 267 days.

(21) Appl. No.: 14/846,969

(22) Filed: Sep. 7, 2015

(65) Prior Publication Data

US 2016/0088514 A1    Mar. 24, 2016

(30) Foreign Application Priority Data

Sep. 19, 2014   (JP) .................................. 2014-191140

(51) Int. Cl.
*H04L 1/16* (2006.01)
*H04W 24/08* (2009.01)
(Continued)

(52) U.S. Cl.
CPC .......... *H04L 1/1685* (2013.01); *H04L 1/1671* (2013.01); *H04L 47/19* (2013.01);
(Continued)

(58) Field of Classification Search
CPC ...... H04L 1/1685; H04L 1/1671; H04L 47/19; H04L 47/26; H04L 67/327; H04W 24/08
(Continued)

(56) References Cited

U.S. PATENT DOCUMENTS 8,762,477 B2 * 6/2014 Xie .................... H04L 67/327
709/213
8,762,570 B2 * 6/2014 Qian .................... H04L 67/327
709/241

(Continued)

OTHER PUBLICATIONS

Van Jacobson et al., "Networking Named Content" ACM CoNEXT'09, Dec. 2009.

(Continued)

*Primary Examiner* — Obaidul Huq
(74) *Attorney, Agent, or Firm* — Greenblum & Bernstein, P.L.C.

(57) ABSTRACT

A congestion control method includes determining whether congestion occurs by monitoring a network, receiving an interest packet including a name of content data that is requested to be sent, generating a first NACK packet indicating an occurrence of congestion if it is determined that the congestion occurs when the interest packet is received, and sending the generated first NACK packet to the network. In the generating of the first NACK packet, if first alternative content data which is an alternative of the content data corresponding to a name included in the received interest packet is stored in a cache of the router, information regarding the first alternative content data is set in the first NACK packet. At least one of the determining whether the congestion occurs, the receiving the interest packet, the generating the NACK packet, and the sending the NACK packet is performed by a processor of the router.

13 Claims, 19 Drawing Sheets

(51) Int. Cl.
*H04L 12/801* (2013.01)
*H04L 12/825* (2013.01)
*H04L 29/08* (2006.01)

(52) U.S. Cl.
CPC ............. *H04L 47/26* (2013.01); *H04W 24/08* (2013.01); *H04L 67/327* (2013.01)

(58) Field of Classification Search
USPC ................................................ 370/229, 230
See application file for complete search history.

(56) References Cited

U.S. PATENT DOCUMENTS

| | | | | |
|---|---|---|---|---|
| 8,837,511 | B2* | 9/2014 | Ravindran | H04W 76/002 370/331 |
| 8,918,835 | B2* | 12/2014 | Ravindran | H04L 63/104 726/1 |
| 9,137,152 | B2* | 9/2015 | Xie | H04L 45/44 |
| 9,185,120 | B2* | 11/2015 | Mahadevan | H04L 63/1408 |
| 9,191,459 | B2* | 11/2015 | Ravindran | H04L 67/327 |
| 9,270,598 | B1* | 2/2016 | Oran | H04L 67/327 |
| 2012/0155464 | A1 | 6/2012 | Kim et al. | |
| 2015/0095481 | A1* | 4/2015 | Ohnishi | H04L 1/004 709/223 |
| 2015/0146737 | A1* | 5/2015 | Muscariello | H04L 47/19 370/400 |
| 2015/0304380 | A1* | 10/2015 | Muramoto | H04N 21/2187 709/219 |
| 2015/0312373 | A1* | 10/2015 | Muramoto | H04L 67/327 370/238 |

OTHER PUBLICATIONS

Cheng Yi et al., "A Case for Stateful Forwarding Plane" NDN, Technical Report NDN-0002, 2012.
Yaogong Wang et al., "An Improved Hop-by-hop Interest Shaper for Congestion Control in Named Data Networking" ACM ICN'13, Aug. 2013, pp. 55-60.
Cheng Yi et al., "Adaptive Forwarding in Named Data Networking" ACM SIGCOMM Computer Communication Review, vol. 42, No. 3, Jul. 2012, pp. 62-67.
Giovanna Carofiglio et al., "ICP: Design and Evaluation of an Interest Control Protocol for Content-Centric Networking" IEEE INFOCOM 2012, pp. 304-309.
Derek Kulinski et al., "NDNVideo: Random-access Live and Pre-recorded Streaming using NDN" NDN, Technical Report NDN-0007, Sep. 2012.

* cited by examiner

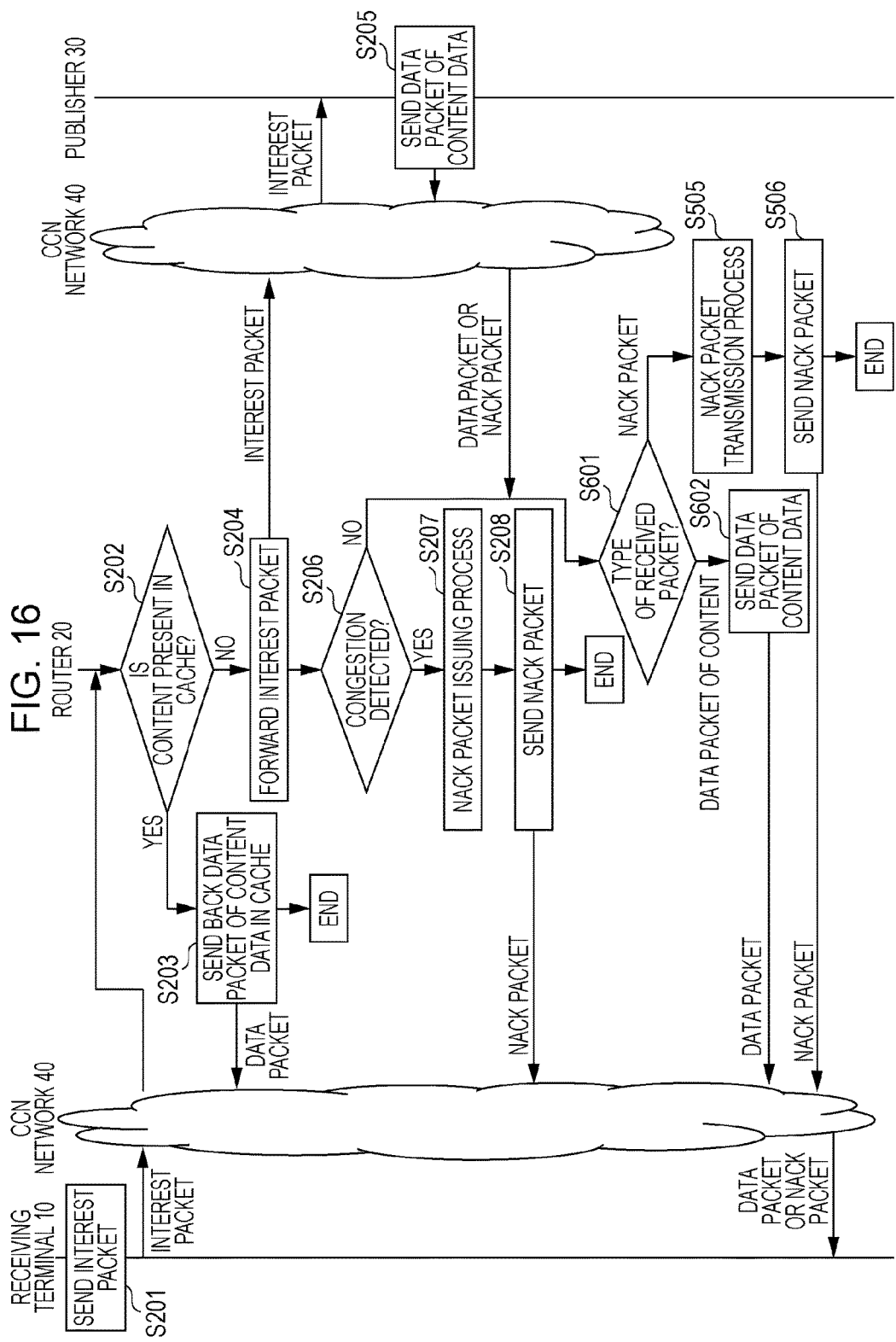

ROUTER, TERMINAL, AND CONGESTION CONTROL METHOD FOR ROUTER AND TERMINAL

BACKGROUND

1. Technical Field

The present disclosure relates to a router and a terminal connected to a content-oriented network, and a congestion control method for the router and terminal.

2. Description of the Related Art

In recent years, a content-oriented network technology for acquiring content data by specifying the name of content data, not the location of the content data, has been developed (refer to, for example, V. Jacobson, D. K. Smetters, J. D. Thornton, M. F. Plass, N. H. Briggs, R. L. Braynard (PARC) Networking Named Content, CoNEXT 2009, Rome, December, 2009, and Cheng Yi, et al. A Case for Stateful Forwarding Plane, NDN, Technical Report NDN-0002, 2012).

In these two non-patent literatures, for example, a technology called "content centric network (CCN)" is described as an example of a content-oriented network.

In a content-oriented network, such as CCN, (hereinafter referred to as a "CCN network"), to acquire content data, a terminal device of a user sends an interest packet including the name of content data, not the location of the content data, to a network. Thereafter, upon receiving the interest packet, a content provider that provides the content sends data packets of the content data corresponding to the name.

At that time, even in distribution of content data using a CCN network, a packet loss may occur due to, for example, congestion of the network, as in Internet communication. If packet loss occurs, distribution of the content data may be delayed and, thus, a variety of issues arise. For example, when a receiving terminal plays back video content data by streaming, playback buffer underrun frequently occurs and, thus, the content cannot be smoothly played back.

To address such an issue, a technique to recover packet loss in a CCN network using retransmission has been developed (refer to, for example, U.S. Patent No. 2012/0155464).

SUMMARY

In one general aspect, the techniques disclosed here feature a congestion control method for use in a router connected to a content-oriented network. The congestion control method includes determining whether congestion occurs by monitoring the network, receiving an interest packet including a name of content data that is requested to be sent, generating a first NACK packet indicating an occurrence of congestion if it is determined that the congestion occurs when the interest packet is received, and sending the generated first NACK packet to the network. In the generating of the first NACK packet, if first alternative content data which is an alternative of the content data corresponding to a name included in the received interest packet is stored in a cache of the router, information regarding the first alternative content data is set in the first NACK packet. At least one of the determining whether the congestion occurs, the receiving the interest packet, the generating of the NACK packet, and the sending of the NACK packet is performed by a processor of the router.

According to the present disclosure, a router, a terminal, and a congestion control method capable of preventing delay of distribution of content data caused by congestion can be provided.

It should be noted that general or specific embodiments may be implemented as a system, a method, an integrated circuit, a computer program, a nonvolatile storage medium, such as a computer-readable CD-ROM, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 16 illustrates the sequence for the entire process performed by the content distribution system according to the second exemplary embodiment.

DETAILED DESCRIPTION

Underlying Knowledge Forming Basis of Aspect of Present Disclosure

Underlying knowledge forming the basis of an aspect of the present disclosure is described below.

Distribution of Content Data in CCN Network

Distribution of content data in a CCN network is described first.

Figure 1:
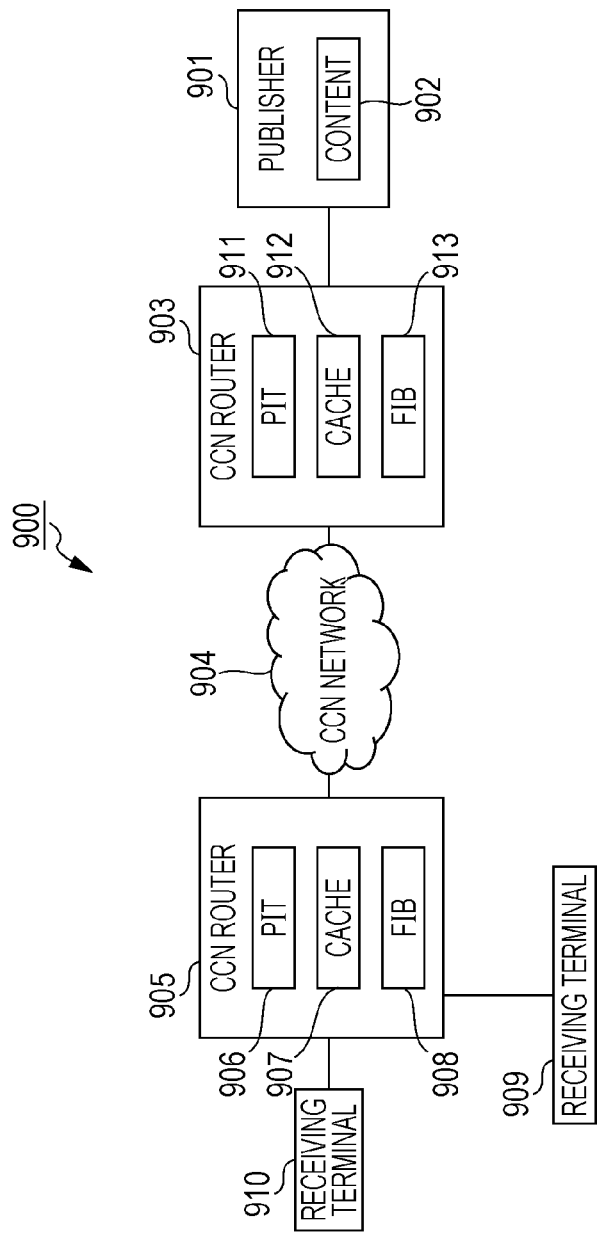
FIG. 1 illustrates an example of a content distribution system in a CCN network.

FIG. 1 illustrates an example of a content distribution system in a CCN network.

As illustrated in FIG. 1, a content distribution system 900 includes a publisher 901, CCN routers 903 and 905, and a CCN network 904.

The publisher 901 stores content 902. The publisher 901 primarily distributes the content 902 as a response to an interest packet.

Each of the CCN routers 903 and 905 is an example of the relaying apparatus of the CCN network 904. The CCN routers 903 and 905 are connected to each other via the CCN network 904.

The CCN router 903 includes a pending interest table (PIT) 911, a cache 912, and a forwarding information base (FIB) 913. The CCN router 905 includes a PIT 906, a cache 907, and an FIB 908. Each of the cache 907 and the cache 912 temporarily stores received content data. Each of the PIT 906 and the PIT 911 stores information regarding from which network interface (hereinafter simply referred to as a "face") an interest packet has been received and information regarding to which face the interest packet has been sent. Each of the FIB 908 and the FIB 913 stores information regarding to which face an interest packet for data in each of name spaces is to be sent.

The CCN network 904 is formed from at least one CCN router. Like the CCN routers 903 and 905, each of CCN routers includes a cache (also referred to as a "cache memory") that temporarily stores received content data, a PIT that stores information indicating from which face the interest packet has been received, and an FIB that stores information regarding to which face an interest packet of data sent to each of name spaces is to be sent.

Each of a receiving terminal 909 and a receiving terminal 910 is connected to the CCN network 904 via the CCN router 905.

A procedure for receiving the content 902 by the receiving terminal 910 in the content distribution system 900 having the above-described configuration is described below.

The receiving terminal 910 sends an interest packet including the name corresponding to the content 902 to the CCN router 905 first.

Subsequently, the CCN router 905 receives the interest packet from the receiving terminal 910. If the cache 907 of the CCN router 905 stores the content data corresponding to the name included in the interest packet, the CCN router 905 sends the content data to the receiving terminal 910. However, if the cache 907 of the CCN router 905 does not store the content data, the CCN router 905 forwards the interest packet to the CCN network 904 in accordance with the information stored in the FIB 908. In addition, the CCN router 905 stores, in the PIT 906, the name included in the interest packet and a face from which the CCN router 905 has received the interest packet. Note that if the information regarding an interest packet for the name that is the same as the name included in the interest packet has already been stored in the PIT 906, the CCN router 905 only stores the information regarding the face from which the interest packet is received without forwarding the interest packet.

Any router that has received the interest packet in the CCN network 904 performs an operation that is the same as the operation performed by the CCN router 905.

At that time, if, in the CCN network 904, all the CCN routers including the CCN router 903 and the CCN router 905 do not cache (store) the content 902, the interest packet received by the receiving terminal 910 reaches the publisher 901.

In such a case, upon receiving the interest packet, the publisher 901 sends back to, for example, the CCN router 903, data of the content 902 corresponding to the name included in the interest packet.

Subsequently, the CCN router 903 transfers the acquired data of the content 902 to the corresponding face on the basis of the information stored in the PIT 911 when the CCN router 903 sent the interest packet to the publisher 901. In addition, the CCN router 903 stores the received data of the content 902 in the cache 912. Thereafter, the CCN router, such as the CCN router 905, in the CCN network 904 transfers the data of the content 902 on the basis of the information in the PIT. In this manner, the data of the content 902 is distributed to the receiving terminal 910.

The procedure for acquiring the same content 902 by the receiving terminal 909 after the receiving terminal 910 has received the content 902 is described below.

The receiving terminal 909 issues an interest packet for the content 902 and sends the interest packet to the CCN router 905 first.

Subsequently, since the CCN router 905 stores, in the cache 907, the data of the content 902 corresponding to the interest packet sent from the receiving terminal 909, the CCN router 905 sends back the data of the content 902 in response to the interest packet sent from the receiving terminal 909.

By using the cache of a CCN router in the CCN network 904 in this manner, the receiving terminal 909 can acquire the data of the content 902 that is the same as the data received by the receiving terminal 910. Accordingly, the traffic in the CCN network 904 is not unnecessarily increased. That is, by using the data of the content 902 stored in a CCN router in the CCN network 904, the traffic in the entire network when the content data is distributed can be decreased.

As described above, content is distributed in a CCN network by using an interest packet including the name when the content is acquired. Since content can be specified by the name of the content instead of the location of the content, the receiving terminal can efficiently receive the content without knowing the location at which the content is stored.

In addition, by using a CCN network, a receiver-driven distribution system in which the receiving terminal requests content and receives the content can be constructed. Accordingly, a large number of users can efficiently receive content, such as content in a video sharing site, without decreasing the image quality of the content.

Issues on Current Congestion Control Technology

Like the communication over the Internet, even in distribution of content data in a CCN network, packet loss may occur due to, for example, congestion. More specifically, like the communication over the Internet using TCP/IP, if an amount of data that exceeds the rate limiting of each of links flows in the link, congestion occurs. The occurrence of congestion causes packet loss. Accordingly, distribution of the content data to a receiving terminal may be delayed. If distribution of the content data to a receiving terminal is delayed, a variety of issues arise. For example, when the receiving terminal plays back video content by streaming, playback buffer underrun frequently occurs. Thus, the content cannot be smoothly played back.

To address such a content data distribution delay issue, a congestion control technology for preventing congestion in a CCN network is needed. More specifically, the following control techniques are required:

1) a detecting technique for detecting the occurrence of congestion in the CCN network, 2) a technique for notifying the receiving terminal of the occurrence of congestion when the congestion is detected, and 3) a control technique for easing the congestion and quickly acquiring the content.

1) To detect congestion occurring in a CCN network, a technique for managing the bandwidth of a link between a CCN router and a higher-layer CCN router has been developed (refer to, for example, Yaogong Wang, et al., An Improved Hop-by-hop Interest Shaper for Congestion Control in Named Data Networking, ACM ICN'13, August 2013, Hong Kong, China). If an amount of data that exceeds the bandwidth of a link flows in the link, it is determined that congestion occurs.

2) In addition, to notify a receiving terminal of the occurrence of congestion, a technique for a CCN router that has detected congestion to send back, to the receiving terminal, a negative acknowledgement (NACK) packet indicating that the content data cannot be acquired has been developed (refer to, for example, Yaogong Wang, et al., An Improved Hop-by-hop Interest Shaper for Congestion Control in Named Data Networking, ACM ICN'13, August 2013, Hong Kong, China, and Cheng Yi, et al., Adaptive Forwarding in Named Data Networking, ACM SIGCOMM Computer Communication Review, Volume 42, Number 3, July 2012).

3) To ease congestion occurring in a CCN network, only unsatisfied control techniques have been developed (refer to, for example, Giovanna Carofiglio, et al., ICP: Design and Evaluation of an Interest Control Protocol for Content-Centric Networking, ACM ICN'12, Aug. 17, 2012, Helsinki, Finland (hereinafter, referred to as "Non Patent Literature (NPL) 5")). To ensure stable data distribution in a CCN network, a control technique for recovering from a congestion condition is required in addition to a control technique for detecting the occurrence of congestion and notifying the receiving terminal of the occurrence of congestion. In NPL 5, congestion control performed by a receiving terminal to recover from the congestion condition when congestion occurs is described. However, the technique simply decreases the number of interest packets to be sent. Accordingly, even when the congestion control technique is applied, the cache of the CCN router, which is the main feature of a CCN, is not effectively used. That is, since the CCN network is not effectively used, improvement of the quality of communication is limited.

Among presently provided Internet services, distribution of video content is one of major services. Accordingly, distribution of video content data is one of the major services even in a CCN network. To distribute video content data, the image quality is important. In general, the image quality of video content increases with increasing bit rate and decreases with decreasing bit rate. Accordingly, to achieve a distribution service of high-quality video content data, a receiving terminal needs to receive the video content data at a bit rate that is higher than or equal to a predetermined bit rate. At that time, an available bandwidth of the network varies as time passes. Thus, if reception of video content data at a bit rate higher than the available bandwidth is carelessly attempted, packet loss occurs and, thus, it is difficult to stably receive and play back the video content data. To stably distribute video content data in a CCN network, a congestion control mechanism that controls congestion caused by a variation of the available bandwidth or an increase in the network traffic is important. However, the congestion control technology for a CCN network has not been sufficiently studied.

Congestion Control Technology for Video Distribution

A congestion control technology for distribution of video content data is described below.

In general, video content data is distributed on a receiving terminal-driven basis, the distributer encodes the video content data at a plurality of bit rates to obtain a plurality of data items. Thereafter, the distributer separates the data item into data units (hereinafter referred to as "chunks") each for several seconds or several frames and holds the chunks. The receiving terminal sequentially requests chunks and plays back the received chunks. Accordingly, even in distribution of the video content data in a CCN network, the receiving terminal sequentially sends an interest packet for a chunk of video content generated by the publisher or the CCN router at a plurality of encoding rate, in general. Thus, the data is received. In this manner, such a video distribution technique is used (refer to, for example, Derek Kulinski, et al., NDNVideo: Random-access Live and Pre-recorded Streaming using NDN, NDN Technical Report NDN-0007, September 2012).

According to such a video distribution technique (i.e., the technique in which the receiving terminal sequentially request the chunks of the video content data), the traffic amount in the CCN network can be controlled using one of two control techniques described below.

According to a first control technique, the receiving terminal controls time intervals of transmitting an interest packet for each of chunks (hereinafter referred to as an "interest packet transmission rate"). For example, as the interest packet transmission rate increases (i.e., the transmission interval decreases), the amount of content data sent back to the receiving terminal within a predetermined period of time increases and, thus, the content data can be quickly received. The downside is that the amount of traffic in the CCN network increases. In contrast, if the interest packet transmission rate decreases (i.e., the transmission interval increases), it takes a longer time to acquire the content data, but the amount of traffic in the CCN network decreases.

According to a second control technique, the receiving terminal controls the encoding rate of the video content data for which the receiving terminal sends an interest packet. For example, if the receiving terminal sends an interest packet for a chunk of the video content data encoded at a lower bit rate, the amount of traffic in the CCN network decreases. In contrast, for example, if the receiving terminal sends an interest packet for a chunk of the video content data encoded at a higher bit rate, the amount of traffic in the CCN network increases.

In this manner, the amount of traffic in a CCN network can be controlled using the transmission interval of the interest packet and the encoding rate of the video content data.

While a large number of proposals for the first control technique used in a CCN network as the congestion control technique have been made, the second control technique is not taken into account. That is, only a relationship between the interest packet transmission rate of the receiving terminal and the traffic is discussed, and only the first control technique that uses simple process to decrease the traffic and recover from congestion by decreasing the interest packet transmission rate when the receiving terminal receives a message indicating the occurrence of congestion is described (refer to, for example, NPL 5). At that time, the second control technique to cause the receiving terminal to select video content having a low bit rate in order to decrease the traffic is not taken into account.

In addition, according to the first control technique described in NPL 5, the amount of data receivable by the receiving terminal per unit time simply decreases by decreasing the interest packet transmission rate. Accordingly, buffer underrun representing an insufficient amount of video content data usable for playback by the receiving terminal occurs and, thus, the playback stops. That is, stable playback cannot be provided if congestion occurs. That is, existing retransmission techniques are not sufficient as a congestion control mechanism that stably distributes video content data in the CCN network. That is, existing retransmission techniques do not sufficiently prevent the delay of distribution of the content data caused by congestion.

Idea According to Exemplary Embodiment of Present Disclosure

Accordingly, the present inventors discovered that to achieve stable playback even when congestion occurs, a congestion control technique including switching among content at the receiver of an interest packet in addition to switching among the interest packet transmission rates of the receiving terminal is required. That is, the present inventors conceived the idea of sending an interest packet for video content having a low bit rate if the available bandwidth of the CCN network is low and sending an interest packet for video content having a high bit rate if the available bandwidth of the CCN network is sufficient. By changing the interest packet transmission rate of the content data and changing the content data to be sent by the interest packet, the content can be stably played back even when congestion occurs.

In addition, the present inventors conceived the idea of providing more efficient congestion control suitable for a CCN network by efficiently using an in-network cache provided in the CCN network. In existing congestion control technologies, video content data stored in the in-network cache is not taken into account. Accordingly, only a technique for, when congestion occurs, changing the content data requested using an interest packet to be sent to the content data having a lower bit rate is proposed. In contrast, if video content data stored in an in-network cache of the CCN network is taken into account, the following idea is conceived. That is, if the content data having a higher bit rate is stored in a router that is closer to the receiving terminal than a link experiencing congestion, the content data requested using an interest packet to be sent can be changed to the content data having a higher bit rate. In this manner, even when congestion occurs, the high-quality image content data may be efficiently obtained.

The above idea is briefly described below with reference to FIG. 2.

Figure 2:
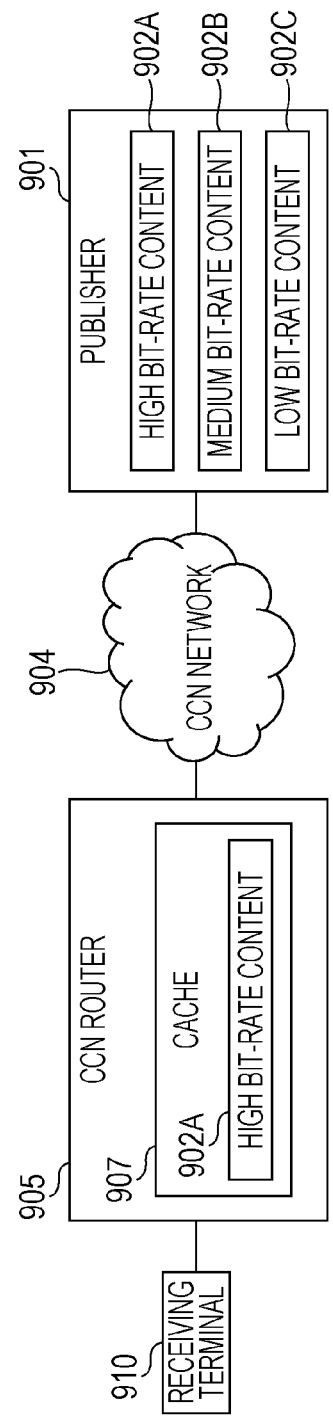
FIG. 2 illustrates content data stored in a CCN network.

FIG. 2 illustrates content data stored in a CCN network. Note that elements that are the same as illustrated in FIG. 1 are given the same reference numerals as those illustrated in FIG. 1, and detailed descriptions of the elements are not repeated.

The publisher 901 holds high bit-rate content 902A, which is content data encoded at a high bit rate, medium bit-rate content 902B, which is content data encoded at a medium bit rate, and a low bit-rate content 902C, which is content data encoded at a low bit rate. In this example, the CCN router 905 has already transferred the high bit-rate content 902A before and, thus, stores the high bit-rate content 902A in the cache 907. At that time, the receiving terminal 910 connected to the CCN router 905 sends an interest packet for the medium bit-rate content 902B.

If no congestion occurs in the CCN network 904, the interest packet is sent to the publisher 901, since the medium bit-rate content 902B is not stored in the CCN router 905. Thereafter, the medium bit-rate content 902B is sent back via the CCN network 904 and the CCN router 905. According to existing congestion control technologies, if congestion occurs in the CCN network 904, the receiving terminal 910 can only change the content requested by the interest packet to be sent to the low bit-rate content 902C having a lower bit rate than the medium bit-rate content 902B. In contrast, according to the above-described idea, since the cache 907 of the CCN router 905 stores the high bit-rate content 902A, the traffic of the CCN network 904 can be decreased by changing the content requested using the interest packet be sent to the high bit-rate content 902A having a higher bit rate than the medium bit-rate content 902B. Thus, the content data can be more efficiently acquired. In addition, the content data having a higher image quality can be acquired.

As described above, according to the idea conceived by the present inventors, to control congestion in the CCN network and prevent the delay of distribution of content data caused by the congestion, the technique for efficiently acquire content data in the CCN network by taking into account the content data stored in a cache is better than the technique for simply decreasing the interest packet transmission rate or the bit rate of the content to be acquired.

Accordingly, the present disclosure provides a router and a terminal capable of preventing the delay of distribution of the content data caused by congestion and a congestion control method for the router and the terminal.

According to an aspect of the present disclosure, a congestion control method for use in a router connected to a content-oriented network is provided. The congestion control method includes determining whether congestion occurs by monitoring the network, receiving an interest packet including a name of content data that is requested to be sent, generating a first NACK packet indicating an occurrence of congestion if it is determined that the congestion occurs when the interest packet is received, and sending the generated first NACK packet to the network. In the generating of the first NACK packet, if first alternative content data which is an alternative of the content data corresponding to a name included in the received interest packet is stored in a cache of the router, information regarding the first alternative content data is set in the first NACK packet. At least one of the determining whether the congestion occurs, the receiving the interest packet, the generating of the NACK packet, and the sending of the NACK packet is performed by a processor of the router.

Thus, a congestion control method capable of preventing delay of distribution of content data caused by congestion can be provided.

More specifically, upon determining that congestion occurs, the router can set, in a first NACK packet, the information regarding the first alternative content data that is present in the cache thereof and send the NACK packet to the receiving terminal. Thus, the receiving terminal can change the content data to be received to the first alternative content data. In this manner, the router allows the receiving terminal to uninterruptedly acquire the content data (the first alternative content data) without generating traffic in the link currently experiencing congestion when congestion occurs.

At that time, for example, the congestion control method may further includes receiving a second NACK packet that further includes one of information regarding the content data and information regarding second alternative content data which is an alternative of the content data and that indicates the occurrence of congestion. In the generating of the first NACK packet, if the first alternative content data is stored in the cache of the router, the first NACK packet may be generated by additionally setting the information regarding the first alternative content data in the received second NACK packet.

For example, if the router receives a second NACK packet including the information regarding the content data or a second NACK packet including the information regarding the second alternative content data which is an alternative of the content data stored in another router, the router generates the first NACK packet by additionally setting, in the second NACK packet, information regarding the first alternative content data stored in the cache thereof and sends the generated first NACK packet. Thus, the receiving terminal can change the content data to be received to one of a plurality of the alternative content data. In this manner, when congestion occurs, the router control method allows the receiving terminal to uninterruptedly acquire the content data (the alternative content data) without generating any traffic in the link experiencing the occurrence of congestion.

In addition, for example, the congestion control method may further includes searching the cache for first alternative content data which is an alternative of content data corresponding to the name included in the interest packet if it is determined that congestion occurs.

In addition, for example, when the router forwards the received interest packet, determination as to whether congestion occurs in the network may be made by monitoring the network.

In addition, for example, the information regarding the first alternative content data may be information regarding content data that is the same as or similar to the content data corresponding to the name included in the interest packet.

In addition, for example, the name included in the interest packet may include a main name of the content data corresponding to the name and information regarding a bit rate of the content data, and the information regarding the first alternative content data may include information indicating that the first alternative content data has a main name that is the same as the main name of the content data corresponding to the name included in the interest packet and has a bit rate that differs from the bit rate included in the name included in the interest packet.

In addition, for example, the information regarding the first alternative content data may include information indicating that the first alternative content data has a main name that is the same as the main name of the content data corresponding to the name included in the interest packet and has a bit rate that is higher than the bit rate included in the name included in the interest packet.

In addition, for example, each of the information regarding the content data, the information regarding the first alternative content data, and the information regarding the second alternative content data may include the main name of a corresponding content data and information regarding a property of the corresponding content data.

At that time, for example, each of the name included in the interest packet, the information regarding the content data, the information regarding the first alternative content data, and the information regarding the second alternative content data may include at least one of a number string and a character string and be expressed in a hierarchical structure.

In addition, for example, each of the information regarding the first alternative content data and the information regarding the second alternative content data may further include information regarding a distance from the terminal that has sent the interest packet and the router.

At that time, for example, the information regarding a distance may be the number of hops representing the number of routers through which the interest packet passes from a terminal that generates the interest packet and sends the interest packet to the router. In the generating of the first NACK packet, "1" may be input to the information regarding the first alternative content data stored in the cache of the router as the information indicating the distance, and "1" may be added to the information indicating the distance included in the information regarding the second alternative content data stored in a cache of a router other than the router. In this manner, when the interest packet is generated and if the terminal that has sent the interest packet receives the first NACK packet, the information indicating the distance corresponding to the first alternative content data included in the first NACK packet represents the number of routers through which the interest packet passes from a terminal that sent the interest packet to the router. In addition, when the information indicating the distance corresponding to the second alternative content data included in the NACK packet represents the number of routers through which the interest packet passes from a terminal that sent the interest packet to the router other than the router.

In addition, the content-oriented network may include a Content Centric Network (CCN).

According to another aspect of the present disclosure, a congestion control method for use in a terminal connected to a content-oriented network is provided. The congestion control method includes sending, to the network, an interest packet including a name of content data that is requested to be sent, receiving a first NACK packet indicating an occurrence of congestion in the network as a reply packet in response to the interest packet, and performing congestion control if the receiver receives the first NACK packet. In the performing of the congestion control, if the received first NACK packet includes information regarding alternative content data which is an alternative of the content data corresponding to a name included in the interest packet, an interest packet is generated by replacing the name with the name of the alternative content data, and the generated interest packet including the name of the alternative content data is sent in sending an interest packet. At least one of the sending of the interest packet, the receiving of the first NACK packet, and the performing congestion control is executed by a processor of the terminal.

According to still another aspect of the present disclosure, a terminal connected to a content-oriented network is provided. The terminal includes a transmitting unit that sends, to the network, an interest packet including a name of content data that is requested to be sent, a receiving unit that receives a first NACK packet indicating an occurrence of congestion in the network as a reply packet in response to the interest packet, and a congestion control unit that performs congestion control if the receiving unit receives the first NACK packet. If the first NACK packet received by the receiving unit includes information regarding alternative content data which is an alternative of the content data corresponding to a name included in the interest packet, the congestion control unit generates an interest packet by replacing the name with the name of the alternative content data and causes the transmitting unit to send the generated interest packet including the name of the alternative content data. At least one of the transmitting unit, the receiving unit, and the congestion control unit includes a processor.

According to yet still another aspect of the present disclosure, a router connected to a content-oriented network is provided. The router includes a cache that stores content data, a receiving unit that receives an interest packet including a name of content data that is requested to be sent, a network monitoring unit that determines whether congestion occurs by monitoring the network, a NACK packet generating unit that generates a first NACK packet indicating the occurrence of congestion if it is determined that the congestion occurs when the interest packet is received, and a transmitting unit that sends the generated first NACK packet. If alternative content data that is an alternative of the content data corresponding to a name included in the interest packet is stored in the cache, the NACK packet generating unit sets information regarding the alternative content data in the first NACK packet. At least one of the receiving unit, the network monitoring unit, the NACK packet generating unit, and the transmitting unit includes a processor.

It should be noted that general or specific embodiments may be implemented as a system, a method, an integrated circuit, a computer program, a nonvolatile storage medium, such as a computer-readable CD-ROM, or any selective combination thereof.

A router, a terminal, and a congestion control method for the router and the terminal according to an exemplary embodiment of the present disclosure are described in detail below with reference to the accompanying drawings.

Note that each of the embodiments described below is a general or specific example of the present disclosure. A value, a shape, a material, a constituent element, the positions and the connection form of the constituent elements, steps, and the sequence of steps described in the embodiments are only examples and shall not be construed as limiting the scope of the present disclosure. In addition, among the constituent elements in the embodiments described below, the constituent element that does not appear in an independent claim, which has the broadest scope, is described as an optional constituent element.

First Exemplary Embodiment

An exemplary embodiment of the present disclosure is described in detail below with reference to the accompanying drawings.

Configuration of Content Distribution System

Figure 3:
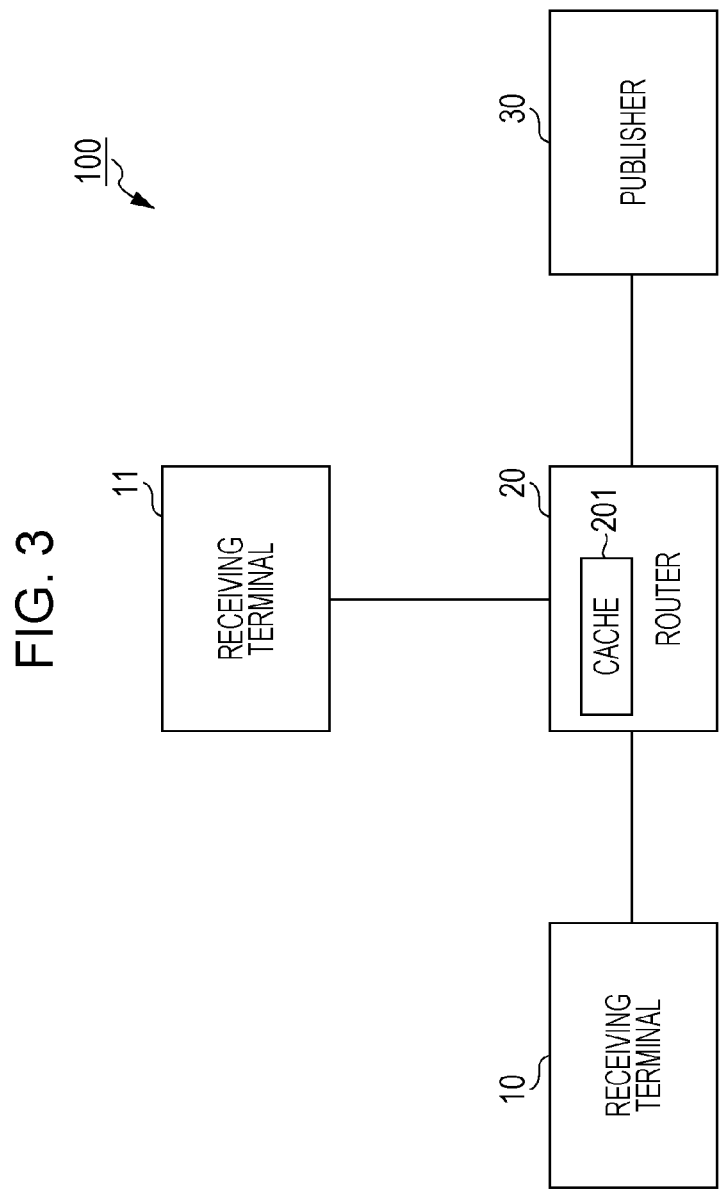
FIG. 3 illustrates an example of the configuration of a content distribution system according to a first exemplary embodiment.

FIG. 3 illustrates an example of the configuration of a content distribution system 100 according to a first exemplary embodiment. The content distribution system 100 includes a plurality of receiving terminals, a plurality of routers each including a cache, and a plurality of publishers. According to the present exemplary embodiment, for simplicity, the content distribution system 100 includes, for example, a receiving terminal 10, a receiving terminal 11, a router 20 having a cache 201, and a publisher 30, as illustrated in FIG. 3.

The receiving terminal 10 and the receiving terminal 11 are connected to a content-oriented network. Each of the receiving terminal 10 and the receiving terminal 11 sends an interest packet including the name of content data and receives a data packet including the content data. According to the present exemplary embodiment, each of the receiving terminal 10 and the receiving terminal 11 is connected to the publisher 30 via, for example, the router 20. By sending an interest packet including the name of the content data to the router 20, each of the receiving terminal 10 and the receiving terminal 11 receives a data packet including the content data from the router 20.

The router 20 is connected to the content-oriented network and forwards an interest packet and a data packet. According to the present exemplary embodiment, the router 20 is connected to the receiving terminal 10 and the receiving terminal 11 and is further connected to the publisher 30.

The publisher 30 is connected to the content-oriented network and sends original content. That is, the publisher 30 holds original content data. According to the present exemplary embodiment, the publisher 30 holds (or stores), in a recording medium (not illustrated) of the publisher 30, content data having a main name of "video/a/" encoded at bit rates of 256 kbps, 512 kbps, and 1 Mbps. The recording medium is a writable recording medium, such as a memory or a hard disk.

In this example, the names of the content data stored in the recording medium (not illustrated) are "video/a/256 kbps", "video/a/512 kbps", and "video/a/1 Mbps". Since the content data having the names of "video/a/256 kbps", "video/a/512 kbps", and "video/a/1 Mbps" have the same main name "video/a/" in the names, the content data have the same content. In contrast, the content data have different bit rates. When the publisher 30 sends (or distributes) content data stored therein or when the receiving terminal 10 requests transfer of the content data, one of the names (name spaces) "video/a/256 kbps", "video/a/512 kbps", and "video/a/1 Mbps" is used. The name of the content data includes, for example, at least one of a number string and a character string and is written in a hierarchical structure.

In this manner, the name of content data used when the content data is distributed and when the content data is requested includes the main name of the content data and information regarding the property of the content data. In this example, the information regarding the property of the content data is the bit rate. However, the information regarding the property is not limited to a bit rate. For example, the resolution of the content data may be used as the information regarding the property of the content data. Alternatively, if the content data is video data, each of the resolution, the frame rate, the time span, and the color space of the content data, for example, may be used as the information regarding the property of the content data.

Configuration of Receiving Terminal

The configuration of one of the receiving terminals 10 and 11 is described below.

Figure 4:
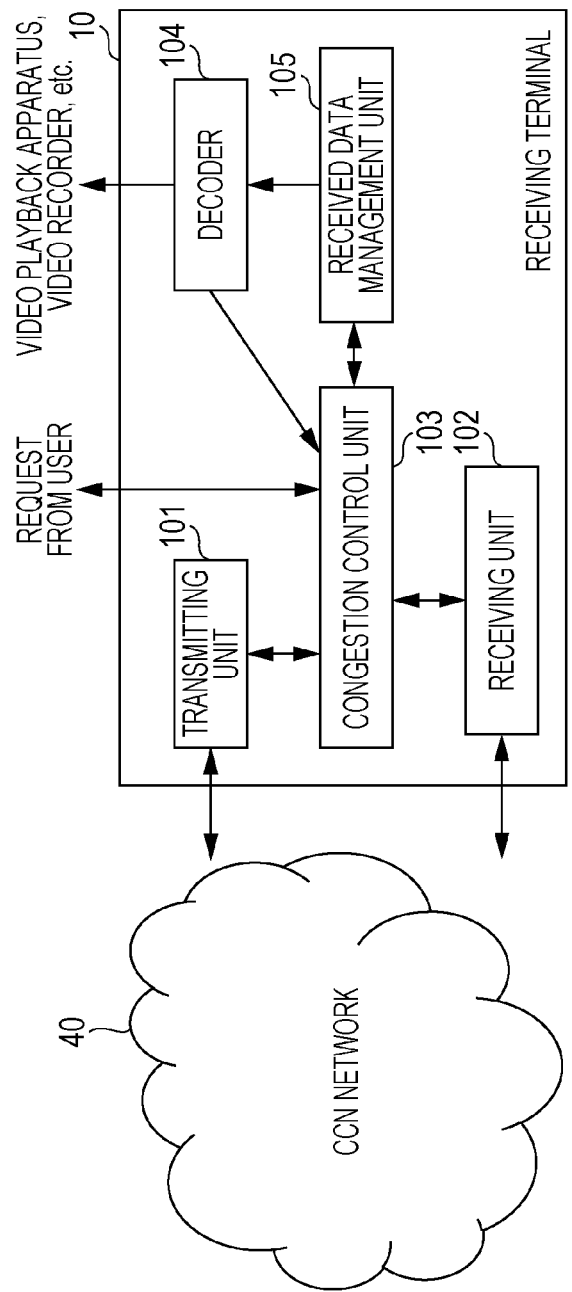
FIG. 4 illustrates an example of the configuration of a receiving terminal according to the first exemplary embodiment.

FIG. 4 illustrates an example of the configuration of the receiving terminal 10 according to the first exemplary embodiment.

The receiving terminal 10 is an example of a terminal connected to a content-oriented network. The receiving terminal 10 sends an interest packet including the name of content data and receives a data packet including the content data. According to the present exemplary embodiment, the receiving terminal 10 is connected to a CCN network 40, which is an example of the content-oriented network.

As illustrated in FIG. 4, the receiving terminal 10 includes a transmitting unit 101, a receiving unit 102, a congestion control unit 103, a decoder 104, and a received data management unit 105.

The transmitting unit 101 sends an interest packet for a CCN. More specifically, the transmitting unit 101 sends an interest packet including the name of content data to the CCN network 40.

The receiving unit 102 receives a data packet for a CCN and a NACK packet. More specifically, the receiving unit 102 receives an interest packet. Note that in some cases, the receiving unit 102 receives a NACK packet that indicates the occurrence of congestion of the CCN network 40 as a reply packet in response to the interest packet.

The congestion control unit 103 controls transmission of an interest packet. More specifically, when the receiving unit 102 receives a NACK packet, the congestion control unit 103 performs congestion control. If the NACK packet received by the receiving unit 102 includes information regarding alternative content data which is an alternative of the content data corresponding to the name included in the interest packet, the congestion control unit 103 generates an interest packet including the name of the alternative content data instead of the name of the original content data. Thereafter, the congestion control unit 103 causes the transmitting unit 101 to send the generated interest packet including the name of the alternative content data.

The received data management unit 105 manages information used by the congestion control unit 103 to perform congestion control and provides the information to the congestion control unit 103 as needed.

The decoder 104 decodes the received content data.

Configuration of Router

The configuration of the router 20 is described below.

Figure 5:
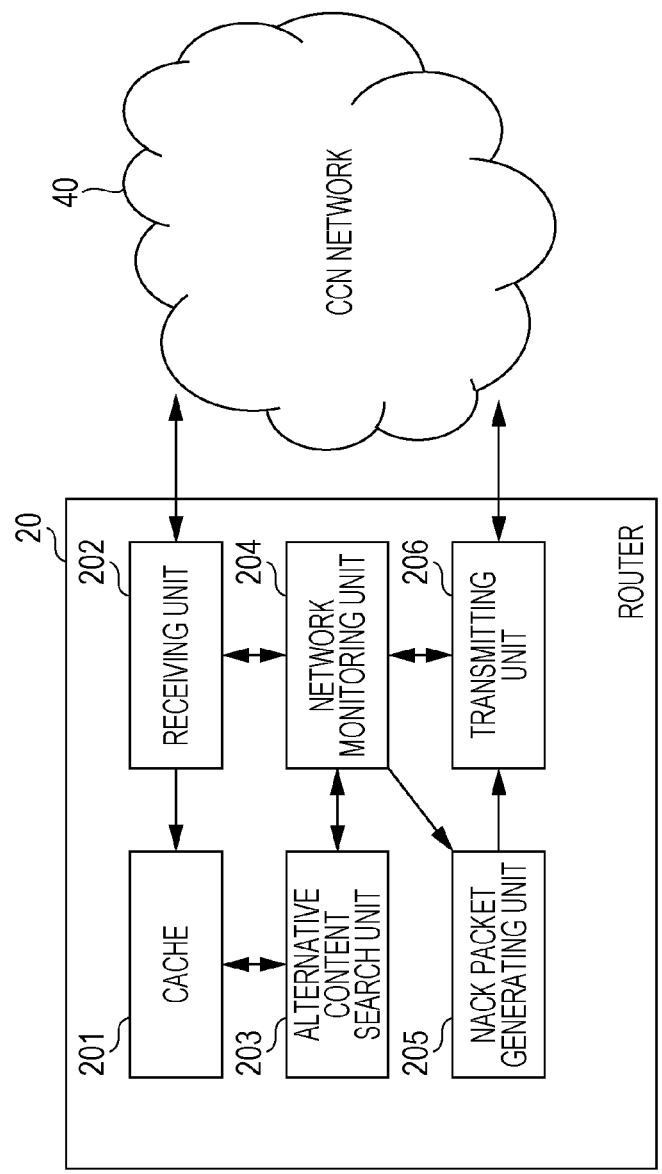
FIG. 5 illustrates an example of the configuration of a router according to the first exemplary embodiment.

FIG. 5 illustrates an example of the configuration of the router 20 according to the first exemplary embodiment.

The router 20 is connected to the content-oriented network and forwards an interest packet and a data packet. According to the present exemplary embodiment, the router 20 is connected to the CCN network 40, which is an example of a content-oriented network.

As illustrated in FIG. 5, the router 20 includes a cache 201, a receiving unit 202, an alternative content search unit 203, a network monitoring unit 204, a NACK packet generating unit 205, and a transmitting unit 206.

The receiving unit 202 receives an interest packet, a content packet, and a NACK packet. More specifically, the receiving unit 202 receives a NACK packet indicating the occurrence of congestion.

The transmitting unit 206 sends an interest packet, a content packet, and a NACK packet. More specifically, the transmitting unit 206 sends the NACK packet generated by the NACK packet generating unit 205.

The alternative content search unit 203 searches the cache 201 for alternative content data. More specifically, when the receiving unit 202 receives an interest packet and if the network monitoring unit 204 detects the occurrence of congestion, the alternative content search unit 203 searches the cache 201 for alternative content data which can be an alternative of the content data corresponding to the name included in the interest packet. At that time, the information regarding the alternative content data is information regarding the content data that is the same as or similar to the content data corresponding to the name of the content data requested to be sent that is included in the interest packet. Note that two content data are the same if at least the main names included in the names of the two content data are the same and the values (or information) indicating the information regarding the properties of the two content data satisfy a predetermined criterion.

An example of the predetermined criterion for satisfying a condition that two content data are the same is that the values (or information) indicated by the information regarding the properties of the two content data included in the names are the same. The condition that two content data are similar to each other is that at least the main names included in the names of the two content data are the same and the values (or information) indicating the information regarding the properties of the two content data satisfy a predetermined criterion. An example of the predetermined criterion for satisfying the similarity is that the values (or the information) indicated by the information regarding the properties of the content data included in the names differ from each other. The above-described criteria are only examples, and the predetermined criteria are not limited thereto. For example, the predetermined criteria can be determined by the administrator of the content distribution system 100 as appropriate.

The information regarding the alternative content data may be, for example, information regarding the content data that has the same content as the content data corresponding to the name included in the interest packet and that has a higher or lower bit rate than the content data included in the name included in the interest packet. Alternatively, the information regarding the alternative content data may be the name used when the content data corresponding to the alternative content data is distributed and when distribution of the content data is requested. In addition, the name of the alternative content data may include at least one of a number string and a character string and may be written in a hierarchical structure.

The network monitoring unit 204 monitors congestion of the network. More specifically, the network monitoring unit 204 monitors the CCN network 40 to detect the occurrence of congestion. By monitoring the CCN network 40 when the router 20 forwards the interest packet, the network monitoring unit 204 determines whether congestion of the CCN network occurs. If the network monitoring unit 204 determines that congestion occurs, the network monitoring unit 204 detects the congestion. The congestion also indicates that although the router 20 forwards an interest packet to the CCN network 40, the router 20 does not receive a reply packet in response to the interest packet. In addition, although the router 20 forwards an interest packet, the router 20 cannot receive the content data corresponding to the name included in the interest packet.

The NACK packet generating unit 205 generates a NACK packet (a first NACK packet) if congestion occurs. More specifically, when the receiving unit 202 receives an interest packet and if the network monitoring unit 204 detects the occurrence of congestion, the NACK packet generating unit 205 generates a NACK packet indicating the occurrence of congestion. If the alternative content data which is the alternative of the content data corresponding to the name included in the interest packet is stored in the cache 201, the NACK packet generating unit 205 sets the information regarding the alternative content data in the NACK packet.

Operation Performed by Content Distribution System

The operation performed by the content distribution system 100 having the above-described configuration is described below.

Figure 6:
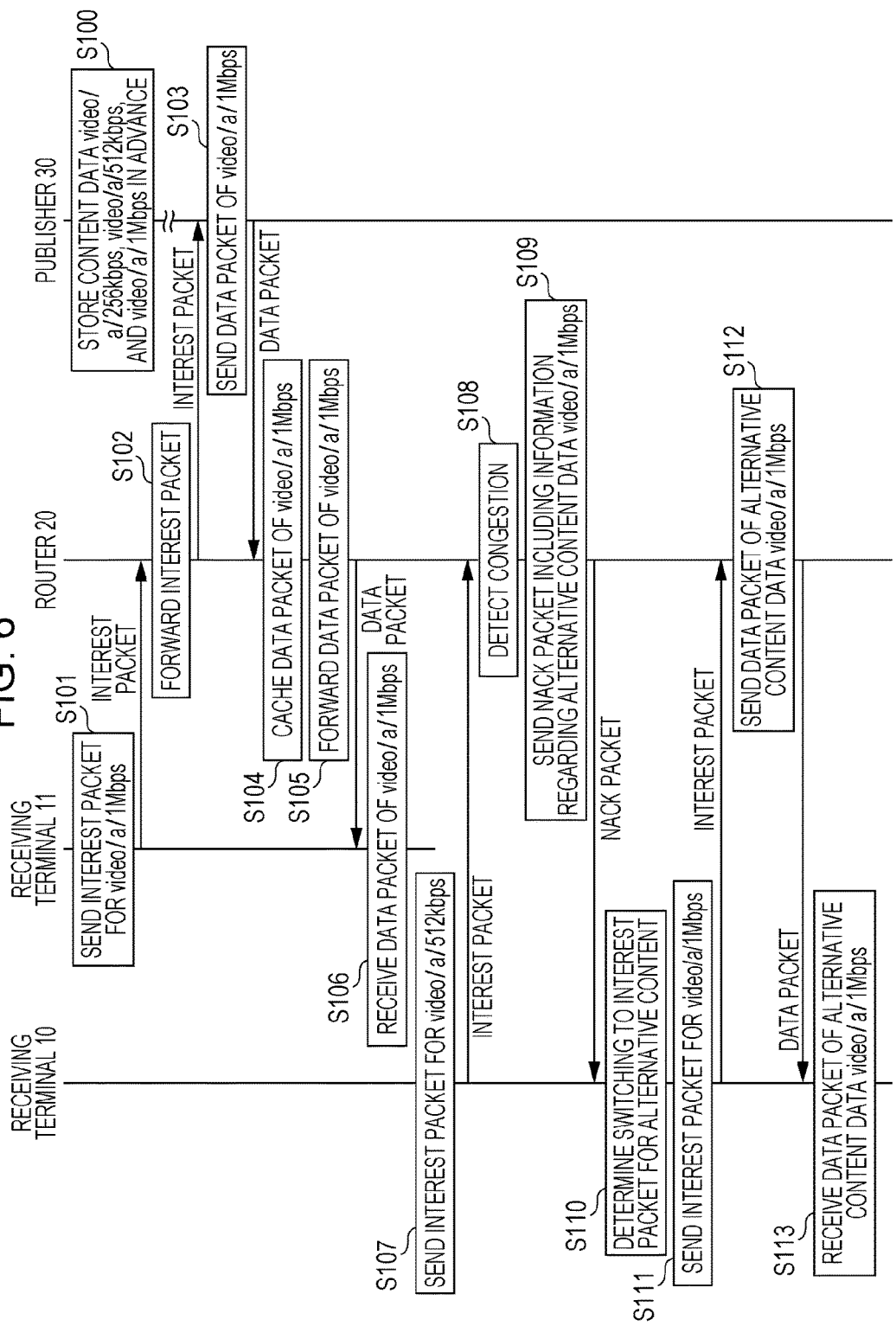
FIG. 6 is a sequence diagram illustrating the process flow of the content distribution system according to the first exemplary embodiment.

FIG. 6 is a sequence diagram illustrating the process flow of the content distribution system 100 according to the first exemplary embodiment. Hereinafter, the operation performed by the content distribution system 100 in the following case is described: the case in which the receiving terminal 11 receives content data having a name of "video/a/1 Mbps" when no congestion occurs and, thereafter, when the receiving terminal 11 attempts to acquire the content data having a name of "video/a/512 kbps", congestion is detected in a link between the router 20 and the publisher 30.

In step S100, the publisher 30 holds content data having a name of "video/a/256 kbps", content data having a name of "video/a/512 kbps", and content data having a name of "video/a/1 Mbps" in advance.

Subsequently, the receiving terminal 11 issues an interest packet for content data having a name of "video/a/1 Mbps" and sends the interest packet (step S101).

Subsequently, upon receiving the interest packet issued by the receiving terminal 11, the router 20 searches the cache 201 thereof for the content data having a name of "video/a/1 Mbps", which is the same as the name included in the interest packet. If the content data is not found in the cache 201, the router 20 forwards the interest packet to the publisher 30 (step S102). Note that if the information regarding an interest packet for the name that is the same as the name included in the interest packet is present in the PIT (not illustrated), the router 20 stores only the information regarding the face that has received the interest packet without forwarding the interest packet. Thereafter, the processing is completed.

Subsequently, upon receiving the interest packet issued by the receiving terminal 11, the publisher 30 sends back a data packet of the content data having a name of "video/a/1 Mbps" to the router 20 (step S103).

Subsequently, upon receiving the data packet of the content data having a name of "video/a/1 Mbps", the router 20 stores the data packet of the content data having a name of "video/a/1 Mbps" in the cache 201 (step S104). In addition, the router 20 forwards the data packet to the receiving terminal 11 (step S105). In step S104, the received content data is stored in the cache 201 of the router 20 by the name "video/a/1 Mbps" of the content data used when the publisher 30 sends the content data.

Subsequently, the receiving terminal 11 receives the data packet of the content data having a name of "video/a/1 Mbps" (step S106).

Thereafter, the receiving terminal 10 issues an interest packet for content data having a name of "video/a/512 kbps" and sends the interest packet (step S107).

Subsequently, upon receiving the interest packet issued by the receiving terminal 11, the router 20 searches the cache 201 thereof for the content data having a name of "video/a/512 kbps", which is the same name as the name included in the interest packet. If the content data is not found in the cache 201, the router 20 determines whether congestion occurs before forwarding the interest packet to the publisher 30. In this example, the router 20 determines that congestion occurs and, thus, detects the congestion (step S108).

Accordingly, the router 20 searches the cache 201 for the alternative content data which is an alternative of the content data corresponding to the name "video/a/512 kbps" included in the interest packet. In this example, since the content data having a name of "video/a/1 Mbps" is stored in step S104, the router 20 is aware that the alternative content data (first alternative content data) is present in the cache 201. In this case, the router 20 generates a NACK packet indicating the occurrence of congestion and including the information regarding the alternative content data having a name of "video/a/1 Mbps" and sends the NACK packet to the receiving terminal 10 (step S109). Note that the content data corresponding to the name "video/a/1 Mbps" and stored in the cache 201 and the content data corresponding to the name "video/a/512 kbps" have the same content (that is, the two content data have the same main name "video/a/"), and only bit rates of the two content data differ from each other. Accordingly, the content data corresponding to the name "video/a/1 Mbps" can be used as an alternative of the content data corresponding to the name "video/a/512 kbps".

Subsequently, upon receiving the NACK packet including the information regarding the alternative content data having a name of "video/a/1 Mbps", the receiving terminal 10 determines whether the interest packet is to be changed to an interest packet for the alternative content data. If the receiving terminal 10 determines that the interest packet is to be changed to an interest packet for the alternative content data (step S110), the receiving terminal 10 issues an interest packet for the alternative content data having a name of "video/a/1 Mbps" and sends the interest packet (step S111).

Subsequently, upon receiving the interest packet for the alternative content data having a name of "video/a/1 Mbps", the router 20 sends a data packet of the alternative content data having a name of "video/a/1 Mbps" to the receiving terminal 10 (step S112), since the alternative content data having a name of "video/a/1 Mbps" is present in the cache 201 of the router 20.

Finally, the receiving terminal 10 receives the data packet of the alternative content data having a name of "video/a/1 Mbps" (step S113).

In this manner, upon detecting the occurrence of congestion, the router 20 sets, in a NACK packet, the information regarding the alternative content data present in the cache 201 thereof and sends the NACK packet. Subsequently, the receiving terminal 10 changes the content data to be received to the alternative content data. Thus, even when congestion occurs, the receiving terminal 10 can uninterruptedly acquire the content data (the alternative content data) without generating any traffic in the link experiencing the congestion.

As a comparative example, the operation performed by a widely used content distribution system is described below. That is, as a comparative example, the operation performed in a case in which the router 20 does not search for the alternative content data even when detecting congestion and sends a NACK packet not including the information regarding the alternative content data is described below.

Figure 7:
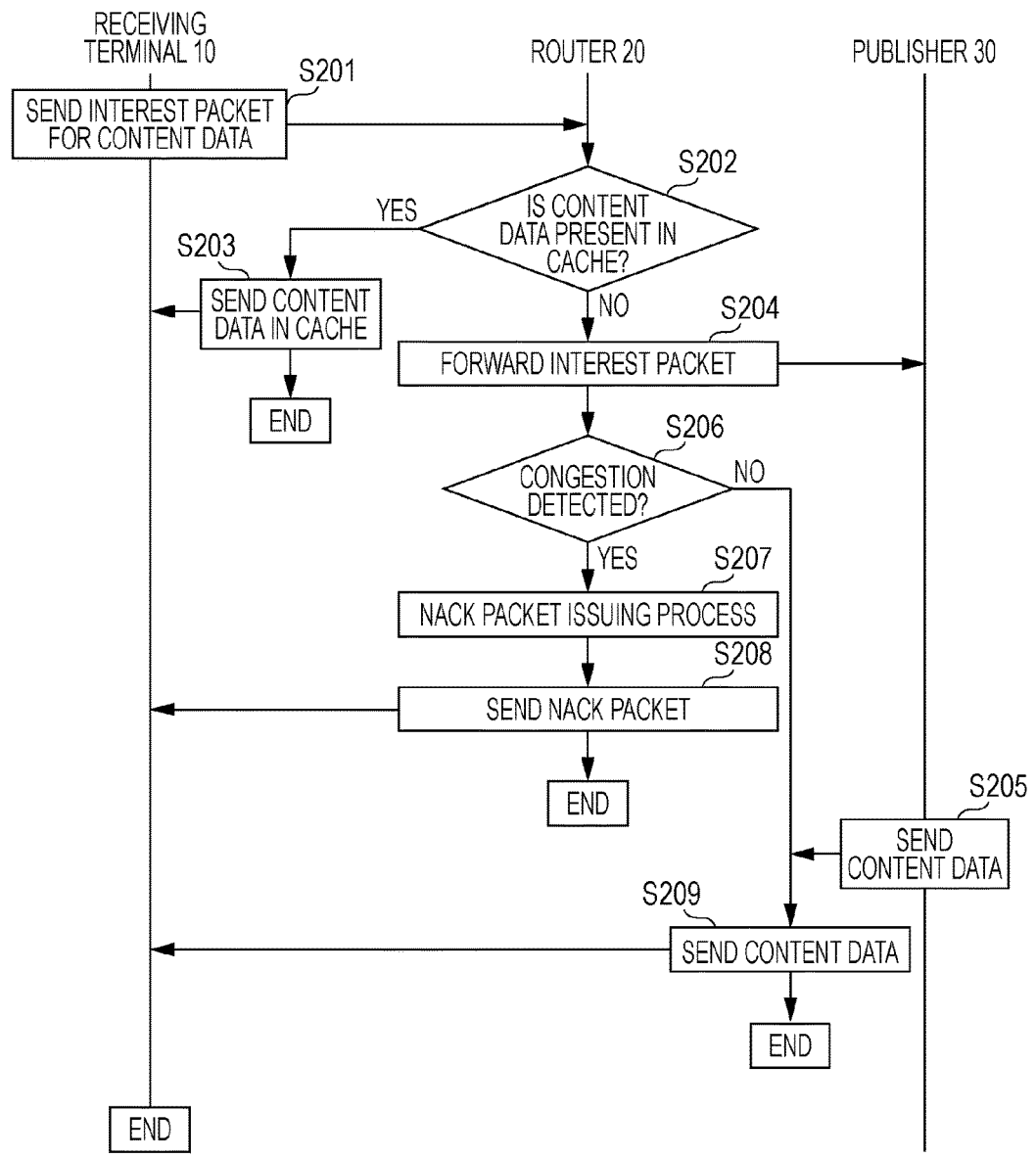
FIG. 7 is a sequence diagram illustrating the process flow of a content distribution system of a comparative example.

FIG. 7 is a sequence diagram illustrating the process flow of a content distribution system of the comparative example.

A receiving terminal 10 issues an interest packet for content data and sends the interest packet first (step S201).

Subsequently, upon receiving the interest packet issued by the receiving terminal 10, a router 20 determines whether the requested content data is present in the cache 201 thereof (step S202).

If, in step S202, the determination is Yes, the router 20 sends, to the receiving terminal 10, a data packet of the content data stored in the cache 201 (step S203). Thereafter, the processing is completed.

However, if, in step S202, the determination is No, the router 20 forwards the interest packet issued by the receiving terminal 10 to the publisher 30 (step S204). Upon receiving the interest packet issued by the receiving terminal 10, the publisher 30 sends the requested content data to the router 20 (step S205). Note that if the information regarding the interest packet for a name that is the same as the name included in the interest packet issued by the receiving terminal 10 is present in the PIT (not illustrated), the router 20 stores only information regarding the face that has received the interest packet without forwarding the interest packet. Thereafter, the processing is completed.

In addition, the router 20 detects whether congestion occurs when forwarding the interest packet (step S206).

If, in step S206, the router 20 detects the congestion (Yes in step S206), the router 20 performs a process for generating a NACK packet indicating the occurrence of congestion (an issuing process) (step S207). Thereafter, the router 20 sends the generated NACK packet to the receiving terminal 10 (step S208).

However, if, in step S206, the router 20 does not detect congestion (No in step S206), the router 20 receives the content data sent from the publisher 30 and sends the content data to the receiving terminal 10 (step S209). Thereafter, the processing is completed.

The operation performed by the content distribution system according to the present exemplary embodiment is described below. Hereinafter, the characteristic operation performed by the router 20 to search for the alternative content data when the router 20 detects congestion and send a NACK packet including the information regarding the alternative content data is mainly described.

Figure 8:
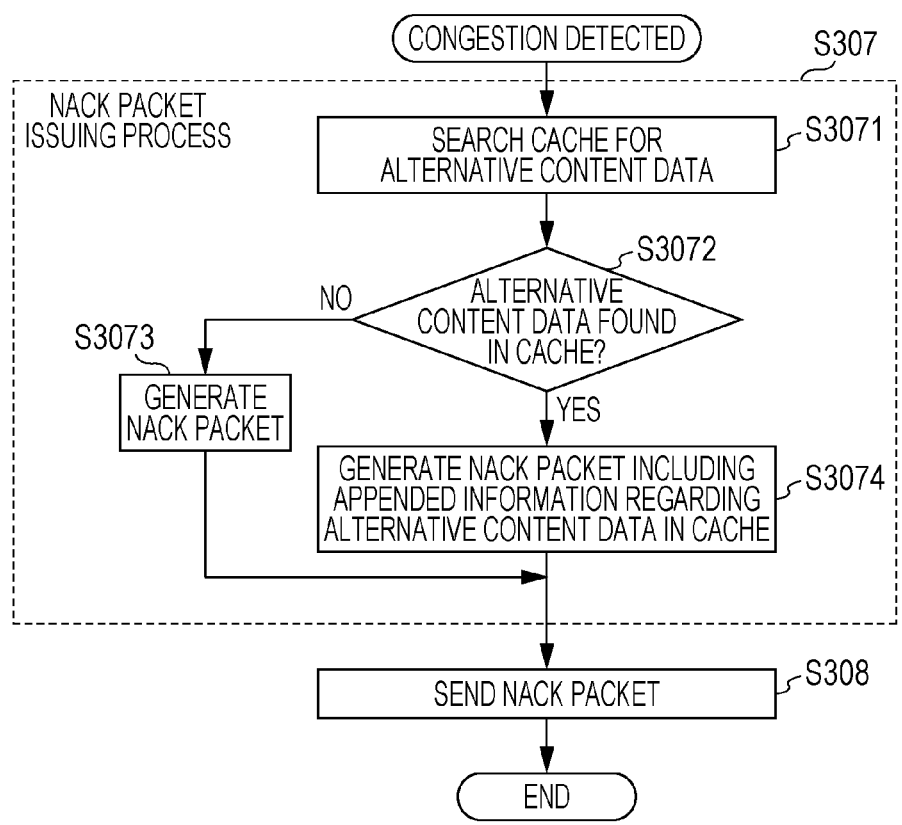
FIG. 8 is a flowchart of a NACK packet issuing process performed by a router according to the first exemplary embodiment.

FIG. 8 is a flowchart of a NACK packet issuing process performed by a router according to the first exemplary embodiment.

The NACK packet issuing process illustrated in FIG. 8 (step S307) corresponds to the NACK packet issuing process illustrated in FIG. 7 (step S207). Unlike the NACK packet issuing process illustrated in FIG. 7, the NACK packet issuing process illustrated in FIG. 8 includes an additional process that is characterized by the present exemplary embodiment.

The network monitoring unit 204 of the router 20 detects congestion. Thereafter, the processing proceeds to the NACK packet issuing process illustrated in step S307 first.

In step S307, the alternative content search unit 203 of the router 20 searches the cache 201 thereof for the alternative content data (step S3071).

Subsequently, the router 20 determines whether alternative content data is found in the cache 201 (step S3072). If the alternative content data is not found (No in step S3072), the NACK packet generating unit 205 generates a NACK packet not including the information regarding the alternative content data (step S3073).

However, if, in step S3072, the alternative content data is found in the cache 201 (Yes in step S3072), the NACK packet generating unit 205 generates a NACK packet including the information regarding the alternative content data (step S3074).

Subsequently, the transmitting unit 206 of the router 20 sends the NACK packet generated in step S3073 or S3074 to the receiving terminal 10 (step S308).

In this manner, when congestion occurs, one of the NACK packet indicating the occurrence of congestion and sent from the router 20 and the NACK packet indicating the occurrence of congestion and including the information regarding the alternative content data can be received.

Example of Structure of NACK Packet

An example of the structure of the NACK packet generated by the router 20 is described below with reference to the accompanying drawings.

Examples of the structure of a NACK packet including the information regarding the alternative content data and examples of the structure of a NACK packet not including the information regarding the alternative content data are described below.

FIGS. 9A to 9E illustrate the examples of the structure of the NACK packet not including the information regarding the alternative content data.

Figure 9A:
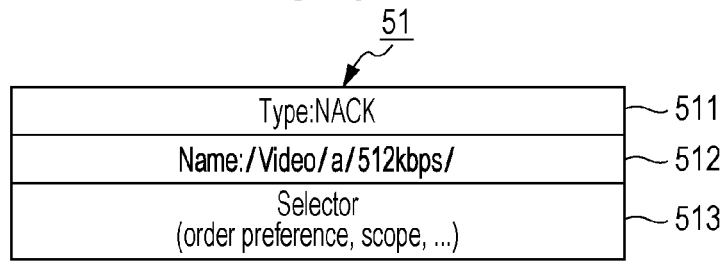
FIG. 9A illustrates an example of the structure of a NACK packet not including information regarding alternative content data.
Figure 9B:
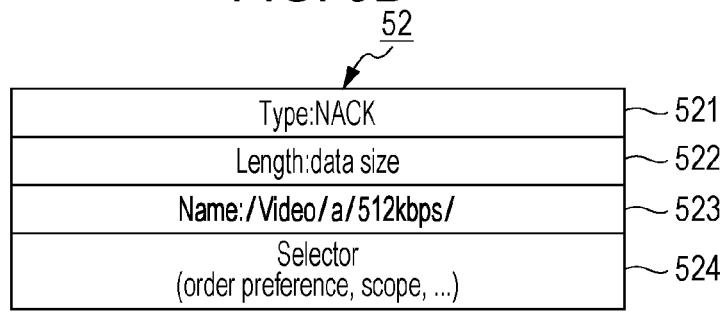
FIG. 9B illustrates an example of the structure of a NACK packet not including information regarding alternative content data.
Figure 9C:
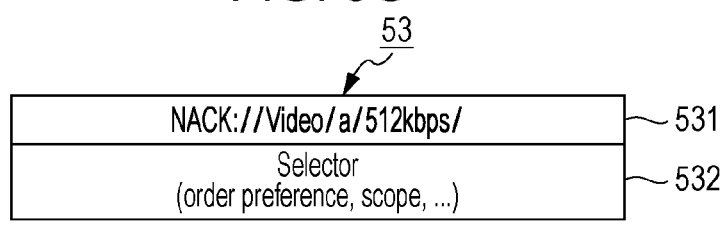
FIG. 9C illustrates an example of the structure of a NACK packet not including information regarding alternative content data.
Figure 9D:
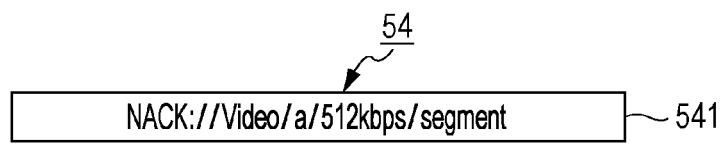
FIG. 9D illustrates an example of the structure of a NACK packet not including information regarding alternative content data.
Figure 9E:
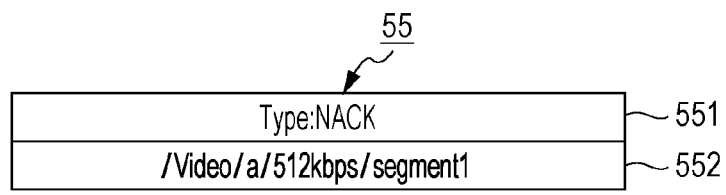
FIG. 9E illustrates an example of the structure of a NACK packet not including information regarding alternative content data.

As illustrated in FIG. 9A, a NACK packet 51 includes a field 511 indicating the packet type, a field 512 indicating the target content of the NACK packet, and a field 513 indicating a selector section. As illustrated in FIG. 9B, a NACK packet 52 includes a field 521 indicating the packet type, a field 522 indicating the packet length, a field 523 indicating the target content of the NACK packet, and a field 524 indicating a selector section. As illustrated in FIG. 9C, a NACK packet 53 includes a field 531 indicating the target content of the NACK packet and the packet type and a field 532 indicating a selector section. As illustrated in FIG. 9D, a NACK packet 54 includes a field 541 indicating the target content of the NACK packet and the packet type. As illustrated in FIG. 9E, a NACK packet 55 includes a field 551 indicating the packet type and a field 552 indicating the target content of the NACK packet.

FIGS. 10A to 10E illustrate examples of the structure of the NACK packet including the information regarding the alternative content data. Note that elements that are the same as illustrated in FIGS. 9A to 9E are given the same reference numerals as those illustrated in FIGS. 9A to 9E, and detailed descriptions of the elements are not repeated.

Figure 10A:
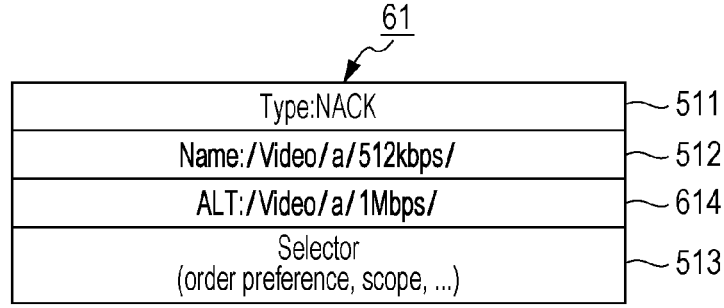
FIG. 10A illustrates an example of the structure of a NACK packet including information regarding alternative content data.
Figure 10B:
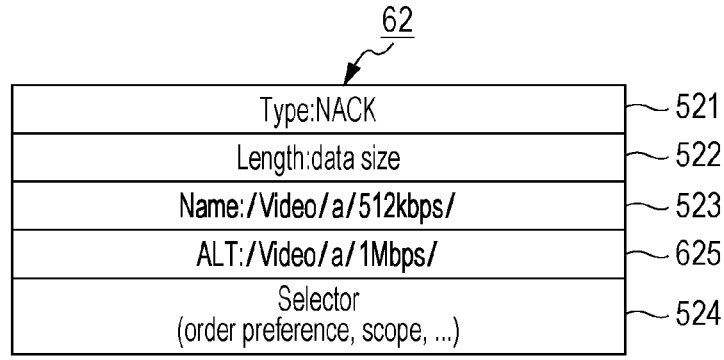
FIG. 10B illustrates an example of the structure of a NACK packet including information regarding alternative content data.
Figure 10C:
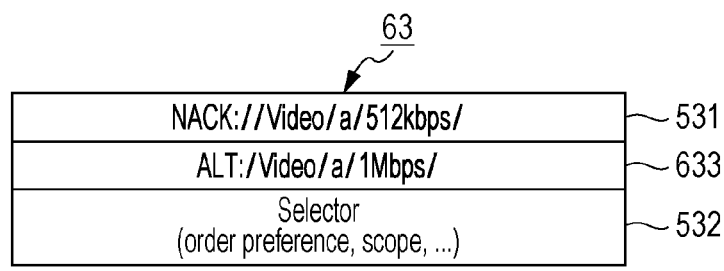
FIG. 10C illustrates an example of the structure of a NACK packet including information regarding alternative content data.

The NACK packets illustrated in FIGS. 10A to 10E have a field that indicates the information regarding the alternative content data in addition to the fields of the NACK packets illustrated in FIGS. 9A to 9E. More specifically, as illustrated in FIG. 10A, a NACK packet 61 further includes a field 614 indicating the information regarding the alternative content data. As illustrated in FIG. 10B, a NACK packet 62 further includes a field 625 indicating the information regarding the alternative content data. As illustrated in FIG. 10C, a NACK packet 63 further includes a field 633 indicating the information regarding the alternative content data.

Figure 10D:
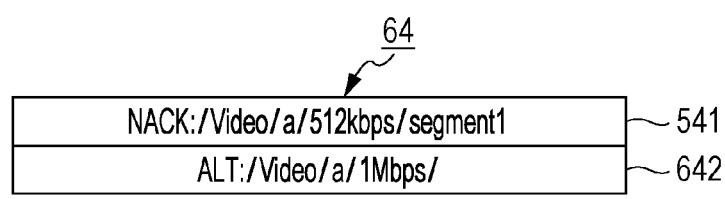
FIG. 10D illustrates an example of the structure of a NACK packet including information regarding alternative content data.
Figure 10E:
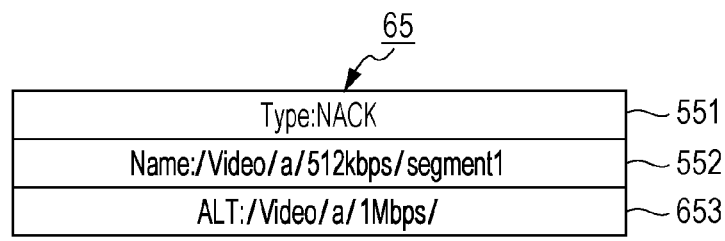
FIG. 10E illustrates an example of the structure of a NACK packet including information regarding alternative content data.
Figure 11A:
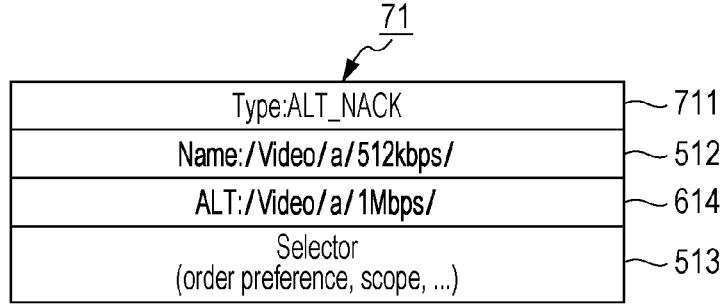
FIG. 11A illustrates another example of the structure of a NACK packet including information regarding alternative content data.
Figure 11B:
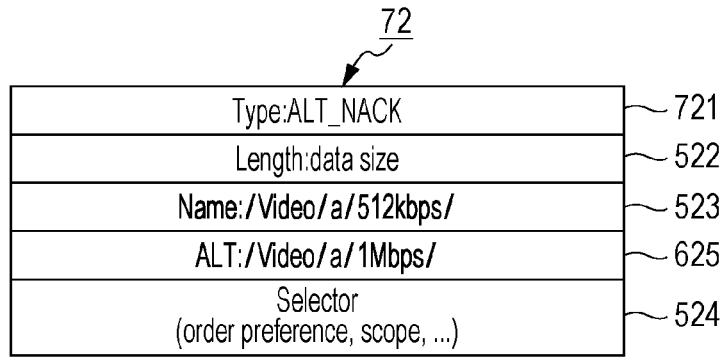
FIG. 11B illustrates another example of the structure of a NACK packet including information regarding alternative content data.
Figure 11C:
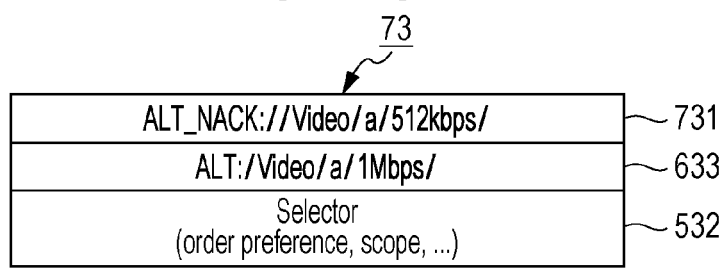
FIG. 11C illustrates another example of the structure of a NACK packet including information regarding alternative content data.
Figure 11D:
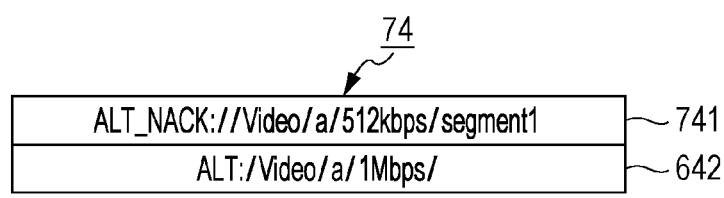
FIG. 11D illustrates another example of the structure of a NACK packet including information regarding alternative content data.
Figure 11E:
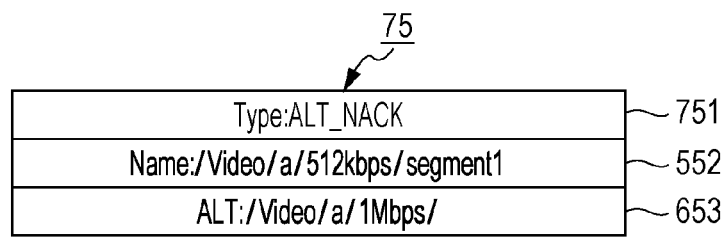
FIG. 11E illustrates another example of the structure of a NACK packet including information regarding alternative content data.

As illustrated in FIG. 10D, a NACK packet 64 further includes a field 642 indicating the information regarding the alternative content data. As illustrated in FIG. 10E, a NACK packet 65 further includes a field 653 indicating the information regarding the alternative content data.

The field of each of the NACK packets illustrated in FIGS. 10A to 10E and indicating the information regarding the alternative content data contains, for example, the name of the alternative content data present in the cache 201 of the router 20.

FIGS. 11A to 11E illustrate other examples of the structure of the NACK packet including the information regarding the alternative content data. Note that elements that are the same as illustrated in FIGS. 9A to 9E and FIGS. 10A to 10E are given the same reference numerals as those illustrated in FIGS. 9A to 9E and FIGS. 10A to 10E, and detailed descriptions of the elements are not repeated.

NACK packets 71 to 75 illustrated in FIGS. 11A to 11E have fields 711 to 751 indicating the packet type, respectively. Each of the fields 711 to 751 contains "Type: ALT_NACK", which indicates that the NACK packet includes the information regarding the alternative content data.

Alternative Content Data

The alternative content search unit 203 of the router 20 searches the cache 201 to determine whether content data that is the same as or similar to the content data requested using the interest packet is present as the alternative content data using a predetermined criterion. An example of the criterion used for searching for the same content data or similar content data when the content data requested using an interest packet is video content is described below.

In this example, the name of video content data used in distribution and a distribution request includes the main name of the video content data and information regarding the property of the video content data. In addition, the information regarding the property of the video content data includes at least one of the resolution, the bit rate employed in encoding, the frame rate, and the color space of the video content data. In this case, for example, content data that has the name the same as the name of video content data corresponding to the name requested using the interest packet and that has a time span the same as the time span included in the name requested using the interest packet and that satisfies one of the following conditions may be searched for as the same content data:

1) content data having a different resolution,
2) content data having a different bit rate in encoding,
3) video content data having a different frame rate, and
4) video content data having a different color space.

The information regarding the property of the video content data further includes the shooting angle of the subject in the video content data, the target subject, and the angle of view of the video content data. In this case, for example, content data that has the name the same as the name of video content data corresponding to the name requested using the interest packet and that satisfies one of the following conditions may be searched for as similar content data:

1) content data having a close time span of the video content,
2) content data having a different shooting angle,
3) content data having a different subject of the video,
4) content data having a different angle of view when the video content was shot, and
5) content data having different information regarding the location at which the video content was shot.

An example of the procedure for searching for the alternative content data by the alternative content search unit 203 using the above-described criteria is described below.

In this example, content data having a main name of "/video/a/" is encoded at 1 Mbps. Part of the content data starting at 1 second and ending at 10 second is defined as new content data having a name of "/video/a/1 Mbps/1 s-10 s/". Then, an interest packet including the name of content data "/video/a/1 Mbps/1 s-10 s/" is issued. In such a case, the alternative content search unit 203 searches the cache 201 to determine whether content data having a main name of "/video/a/" is present first. If the matched content data is present and the content data has a different bit rate and the same data span (e.g., content data having a name of "/video/a/2 Mbps/1 s-10 s/"), the content data can be used as the alternative content data, since the content data is the same as the content data corresponding to the name included in the interest packet. Thereafter, the alternative content search unit 203 completes the search operation. In this manner, the NACK packet generating unit 205 can set, in a NACK packet, the information regarding the alternative content data.

While the above description has been made with reference to the alternative content data that is video content, the alternative content data is not limited thereto. The alternative content is not limited to video. For example, as described in more detail below, alternative content data for widely used sensor data can be employed. That is, the alternative content data may be searched for as content data that has, for example, a name the same as the name indicating the entire sensor and that is the same as one of the following content data requested using an interest packet:

1) content data having a different sampling period,
2) content data collected using a different collection method, and
3) content data measured with a different measurement accuracy.

In such a case, each of the name included in the interest packet and the name of the alternative content data needs to include a name indicating the entire sensor data and one of the sampling period, the data collection method, and the measurement accuracy as the property information regarding the sensor data.

In addition, for example, the alternative content data that is searched for as content data that is similar to the content data requested using the interest packet may be content data having a name that indicates the entire sensor data and that is the same as the name of the original content data and, in addition, satisfying the following condition:

1) content data having close location information at which the data are collected,
2) content data having a different number of data elements, or
3) content data having a close data measurement period of time.

In such a case, each of the name included in the interest packet and the name of the alternative content data needs to include the name indicating the entire sensor data and at least one of the location information indicating the location at which the data are collected, the number of data elements, and the data measurement period of time as the property information regarding the sensor data.

Note that to determine whether the location information at which the data are collected is close and whether the data measurement period of time is close, the conditions or the values used for determination can be stored in a router 21, and the determination can be made in accordance with the stored conditions or values.

Operation Performed by Receiving Terminal

The operation performed by the receiving terminal 10 according to the present exemplary embodiment is described below.

Figure 12:
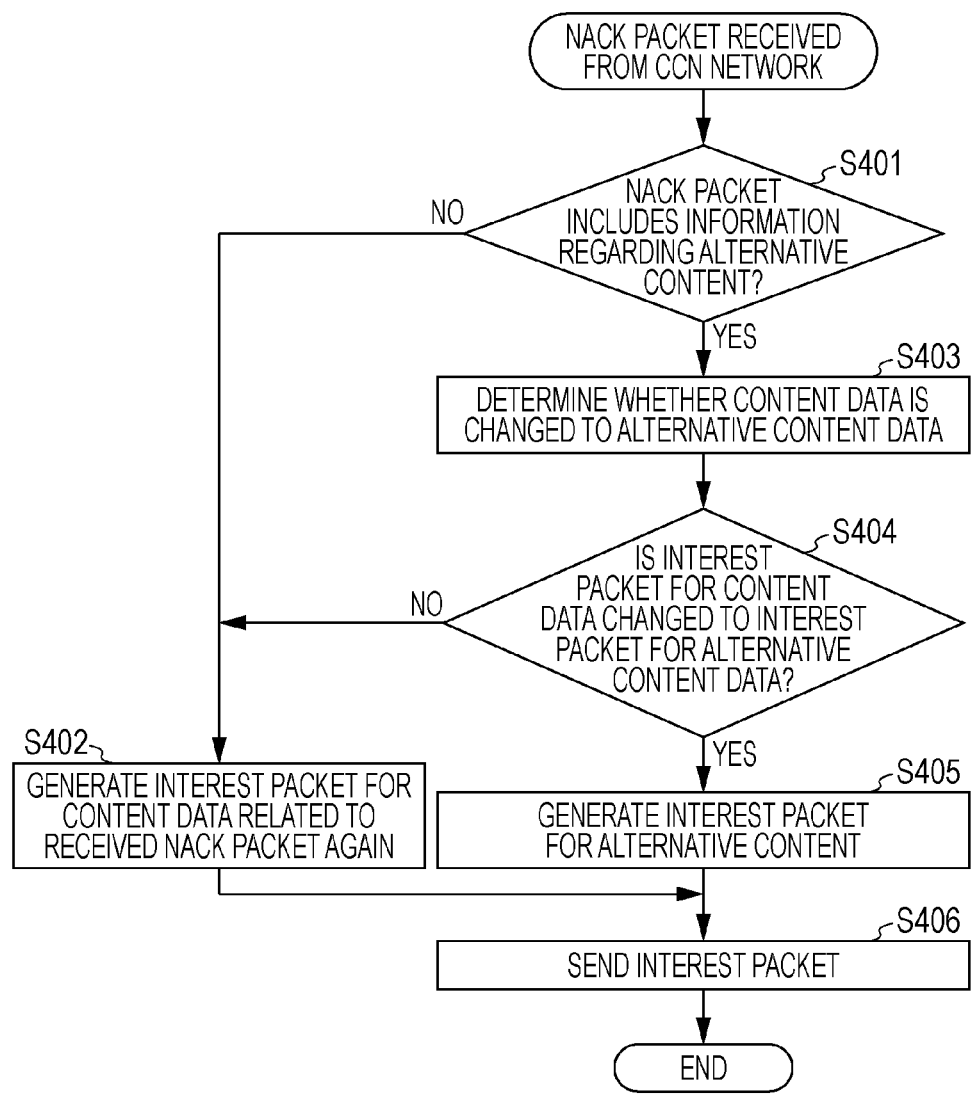
FIG. 12 is a flowchart of the operation performed by a receiving terminal according to the first exemplary embodiment when the receiving terminal receives a NACK packet.

FIG. 12 is a flowchart of the operation performed by the receiving terminal 10 according to the first exemplary embodiment when the receiving terminal 10 receives a NACK packet.

When congestion occurs in the CCN network 40 and, thus, it is difficult for the receiving terminal 10 to receive a data packet, the receiving terminal 10 receives a NACK packet first.

Subsequently, the receiving terminal 10 determines whether the NACK packet includes the information regarding the alternative content data (step S401).

If the information regarding the alternative content data is not included in the NACK packet (No in step S401), the receiving terminal 10 generates an interest packet for the content data related to the received NACK packet again (step S402) and sends the interest packet to the CCN network 40 again (step S406).

However, if, in step S401, the information regarding the alternative content data is included in the NACK packet (Yes in step S401), the congestion control unit 103 of the receiving terminal 10 sends an inquiry to the received data management unit 105 and determines whether the name of the requested content data included in the interest packet can be changed to the name of the alternative content data (step S404).

If the change in the name in the interest packet is not allowed (No in step S404), the receiving terminal 10 generates an interest packet for the content data related to the received NACK packet again (step S402) and sends the interest packet to the CCN network 40 again (step S406).

However, if, in step S404, the name of the requested content data included in the interest packet is changed to the name of the alternative content data since, for example, the name space of the transmission destination in the interest packet can be changed (Yes in step S404), the receiving terminal 10 generates an interest packet including the name of the alternative content data (step S405). Thereafter, the receiving terminal 10 sends the generated interest packet to the CCN network 40 (step S406).

As described above, if the information regarding the alternative content data is included in the NACK packet, the receiving terminal 10 can quickly acquire the alternative content data from, for example, the router 20 when congestion occurs. In addition, since congestion control for the CCN network 40 can be performed, the CCN network 40 can quickly recover from congestion.

Effects of First Exemplary Embodiment

As described above, according to the present exemplary embodiment, a router, a terminal, and a congestion control method for the router and the terminal capable of preventing the delay of distribution of content data caused by congestion can be provided.

More specifically, upon detecting the occurrence of congestion, the router 20 can set, in a NACK packet, the information regarding the alternative content data that is present in the cache 201 thereof and send the NACK packet to the receiving terminal 10. Thus, the receiving terminal 10 can change the content data to be received to the alternative content data. In this manner, when congestion occurs, the router 20 allows the receiving terminal 10 to uninterruptedly acquire the content data (the alternative content data) without generating traffic in the link currently experiencing congestion.

That is, by receiving a NACK packet including the information regarding the alternative content data, the receiving terminal 10 can change the name of the content data to be sent that is included in the interest packet to be sent to the name of the alternative content data. In this manner, the receiving terminal 10 can acquire the alternative content data from a link of the network other than the link experiencing congestion without requesting the content data from the link experiencing congestion. Thus, the receiving terminal 10 can bypass the link experiencing congestion and avoid delay of real-time distribution of the content data. In addition, the congestion control technology for quickly recovering from congestion can be provided.

As described above, according to the present exemplary embodiment, in distribution of content data using the CCN network 40, the following congestion control technology can be provided. That is, the congestion control technology achieves efficient use of the network capable of avoiding congestion by connecting the router 20 to the CCN network 40 and effectively using the cache of the router 20 that relays data between the receiving terminal 10 and the publisher 30. In addition, the congestion control technology is capable of easing the congestion.

Second Exemplary Embodiment

The first exemplary embodiment has been described with reference to the example in which only one router 20 is disposed between the link experiencing congestion and the receiving terminal 10. However, in actual CCN network 40, a plurality of routers are disposed between the receiving terminal 10 and the publisher 30. In addition, the content data having different names may be stored in the cache of each of the routers.

Such a case is described below as the present exemplary embodiment.

Configuration of Content Distribution System

Figure 13:
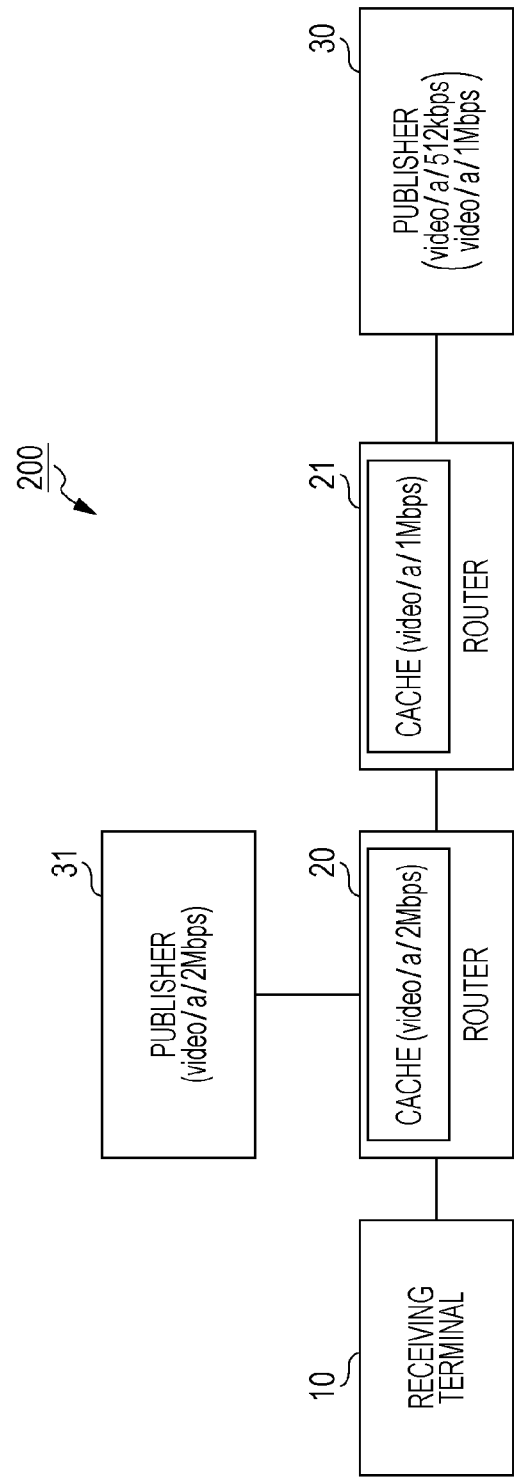
FIG. 13 illustrates an example of the configuration of a content distribution system according to a second exemplary embodiment.

FIG. 13 illustrates an example of the configuration of a content distribution system 200 according to the second exemplary embodiment. The content distribution system 200 includes a plurality of receiving terminals, a plurality of routers each having a cache, and a plurality of publishers. Like the first exemplary embodiment, for simplicity, the content distribution system 200 including the receiving terminal 10, the router 20, a router 21, a publisher 30, and a publisher 31 is described below. Note that elements that are the same as illustrated in FIG. 3 are given the same reference numerals as those illustrated in FIG. 3, and detailed descriptions of the elements are not repeated.

According to the present exemplary embodiment, as illustrated in FIG. 13, the receiving terminal 10 is connected to the publisher 30 via the routers 20 and 21 and is connected to the publisher 31 via the router 20. The router 20 and the router 21 store content data having a name of "video/a/2 Mbps" and content data having a name of "video/a/1 Mbps" in the caches thereof, respectively, through the content data acquisition process performed by a user other than the receiving terminal 10.

The configuration of each of the publisher 30 and the publisher 31 is the same as that of the publisher 30 according to the first exemplary embodiment. Accordingly, description of the configuration of the publisher 30 and the publisher 31 is not repeated. The publisher 30 holds content data having a name of "video/a/512 kbps" and content data having a name of "video/a/1 Mbps" in a recording medium thereof. The publisher 31 holds content data having a name of "video/a/2 Mbps" in a recording medium thereof (not illustrated). The recording medium of the publisher 31 is a writable recording medium, such a memory or a hard disk.

Although the configuration of each of the router 20 and the router 21 is the same as that of the router 20 according to the first exemplary embodiment, only the receiving unit 202 and the NACK packet generating unit 205 are described below, since some of the operations differs from the operations of the receiving unit 202 and the NACK packet generating unit 205 according to the first exemplary embodiment.

The receiving unit 202 receives an interest packet, a content packet, and a NACK packet. More specifically, the receiving unit 202 receives a NACK packet indicating the occurrence of congestion. According to the present exemplary embodiment, in addition to a NACK packet indicating only the occurrence of congestion, the receiving unit 202 receives a NACK packet (a second NACK packet) that indicates the occurrence of congestion and that includes the information regarding the alternative content data.

The NACK packet generating unit 205 generates a NACK packet (a first NACK packet) when congestion occurs. More specifically, when the receiving unit 202 receives an interest packet and if the network monitoring unit 204 detects the occurrence of congestion, the NACK packet generating unit 205 generates a NACK packet indicating the occurrence of congestion. If the alternative content data which is an alternative of the content data corresponding to the name included in the interest packet is stored in the cache 201, the NACK packet generating unit 205 generates a NACK packet by setting, in the received NACK packet, the information regarding the alternative content data.

According to the present exemplary embodiment, when the receiving unit 202 receives the NACK packet including the information regarding the alternative content data (second alternative content data) and if the alternative content data which is an alternative of the content data corresponding to the name included in the interest packet is stored in the cache 201, the NACK packet generating unit 205 adds the information regarding the alternative content data to the NACK packet received by the receiving unit 202 and generates a new NACK packet. Note that the second alternative content data is the content data which is an alternative of the content data corresponding to the name included in the interest packet. Thereafter, the transmitting unit 206 sends the new NACK packet generated by the NACK packet generating unit 205.

As described above, when the content data having the same content but different bit rate are stored in the cache of each of the routers (the router 20 and the router 21) and if congestion occurs between the router 21 and the publisher 30, the plurality of content data stored in each of the routers are presented as the alternative content data instead of presenting only one alternative content data as in the first exemplary embodiment. In this manner, the receiving terminal 10 can perform more suitable congestion control.

The operation performed by the content distribution system 200 is described in more detail below with reference to FIG. 14.

Operation Performed by Content Distribution System

Figure 14:
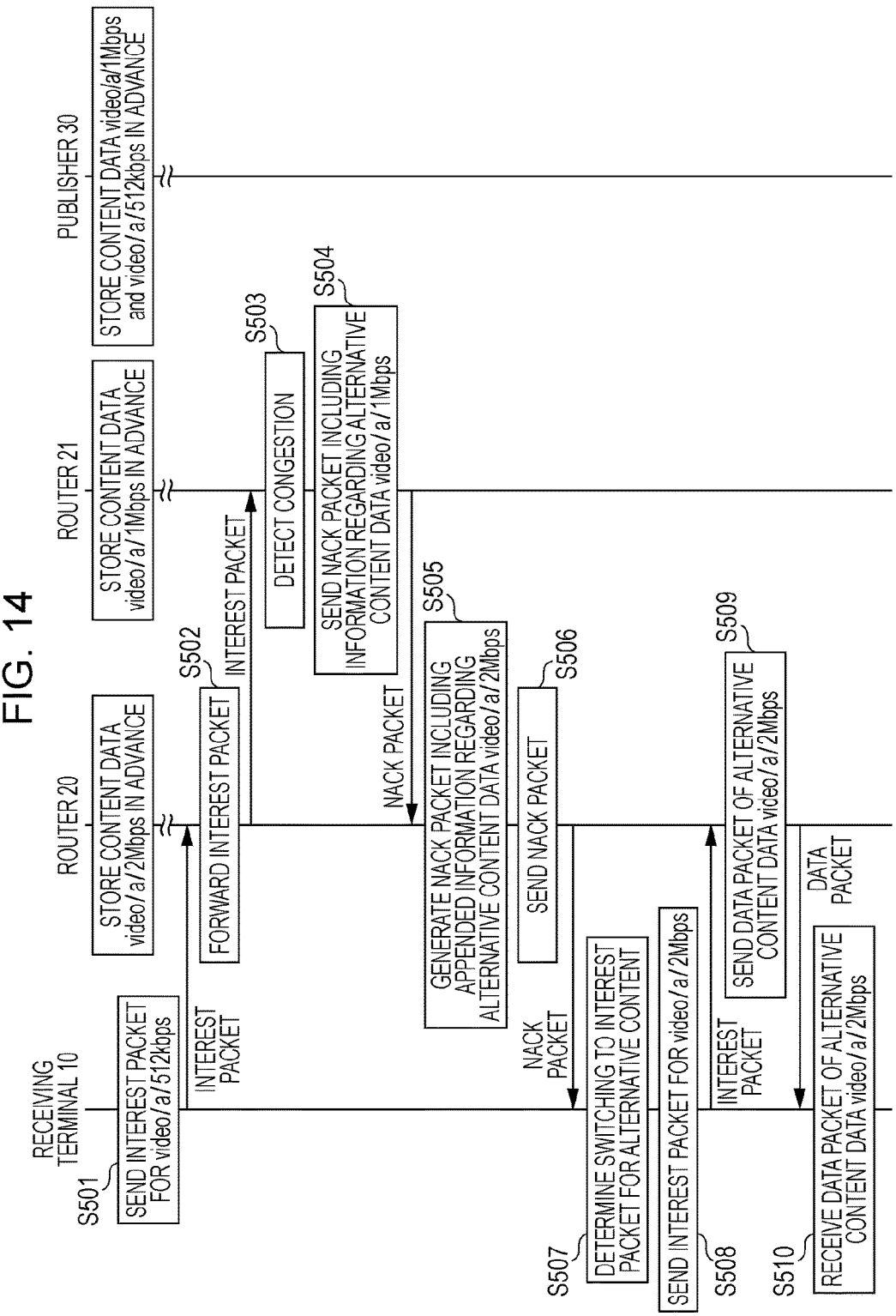
FIG. 14 is a sequence diagram illustrating the process flow of the content distribution system according to the second exemplary embodiment.

FIG. 14 is a sequence diagram illustrating the process flow of the content distribution system 200 according to the second exemplary embodiment.

A receiving terminal 10 issues an interest packet for content data having a name of "video/a/512 kbps" and sends the interest packet (step S501).

Subsequently, upon receiving the interest packet, a router 20 forwards the received interest packet to the router 21 (step S502). Note that if the information regarding the interest packet for a name that is the same as the name included in the interest packet issued by the receiving terminal 10 has already been stored the PIT (not illustrated), the router 20 stores only the information regarding the face that has received the interest packet without forwarding the interest packet. Thereafter, the processing is completed.

Subsequently, upon receiving the interest packet, the router 21 attempts to forward the interest packet to the publisher 30. When the router 21 forwards the interest packet, the router 21 determines whether congestion occurs between the router 21 and the publisher 30. If the router 21 determines that congestion occurs between the router 21 and the publisher 30, the router 21 detects the congestion (step S503).

Subsequently, upon detecting the congestion, the router 21 searches the cache thereof for the alternative content data which is an alternative of the requested content data. According to the present exemplary embodiment, the router 21 can find the content data having a name of "video/a/1 Mbps" as the alternative content data. Accordingly, the router 21 generates, for example, a NACK packet including a name of "video/a/1 Mbps" as the information regarding the alternative content data. Thereafter, the router 21 sends, to the router 20, the generated NACK packet including the information regarding the alternative content data "video/a/1 Mbps" (step S504).

Subsequently, upon receiving the generated NACK packet including the information regarding the alternative content data "video/a/1 Mbps", the router 20 further searches the cache thereof for the alternative content data which is an alternative of the requested content data. According to the present exemplary embodiment, the router 20 can find, in the cache, the content data having a name of "video/a/2 Mbps" as the alternative content data. Accordingly, the router 20 generates a new NACK packet having the name "video/a/2 Mbps" appended to the NACK packet (step S505).

Subsequently, the router 20 sends (forwards), to the receiving terminal 10, the NACK packet having the information regarding the alternative content data "video/a/2 Mbps" appended to the NACK packet (step S506).

Subsequently, the receiving terminal 10 can be aware that it cannot acquire the requested content data having a name of "video/a/512 kbps" due to the occurrence of congestion but can acquire the alternative content data having a name of "video/a/1 Mbps" and the alternative content data having a name of "video/a/2 Mbps". Thus, the receiving terminal 10 determines to change the content data to one of the two alternative content data (step S507).

Subsequently, the receiving terminal 10 selects an optimum one of the alternative content data using the information regarding the alternative content data included in the NACK packet and issues an interest packet for the selected alternative content data. Thereafter, the receiving terminal 10 sends the interest packet again. According to the present exemplary embodiment, the receiving terminal 10 issues an interest packet for the alternative content data having a name of "video/a/2 Mbps" and sends the interest packet (step S508).

Subsequently, upon receiving the interest packet for the alternative content data having a name of "video/a/2 Mbps", the router 20 sends a data packet of the alternative content data having a name of "video/a/2 Mbps" to the receiving terminal 10 since the alternative content data having a name of "video/a/2 Mbps" is present in the cache 201 of the router 20 (step S509).

Finally, the receiving terminal 10 receives the data packet of the alternative content data having a name of "video/a/2 Mbps" (step S510).

In this manner, the receiving terminal 10 can receive the alternative content data without being interfered by congestion. That is, by setting a plurality of pieces of information regarding the alternative content data in the information regarding alternative content data, the receiving terminal 10 can acquire the alternative content data that is optimum for the current situation without generating traffic in the link experiencing congestion.

Details of NACK Packet Forwarding Process

The process performed in step S505 illustrated in FIG. 14 is described in detail below. Although the process is performed by all the routers, the following description is made with reference to the process performed by the router 20, which represents all the routers.

Figure 15:
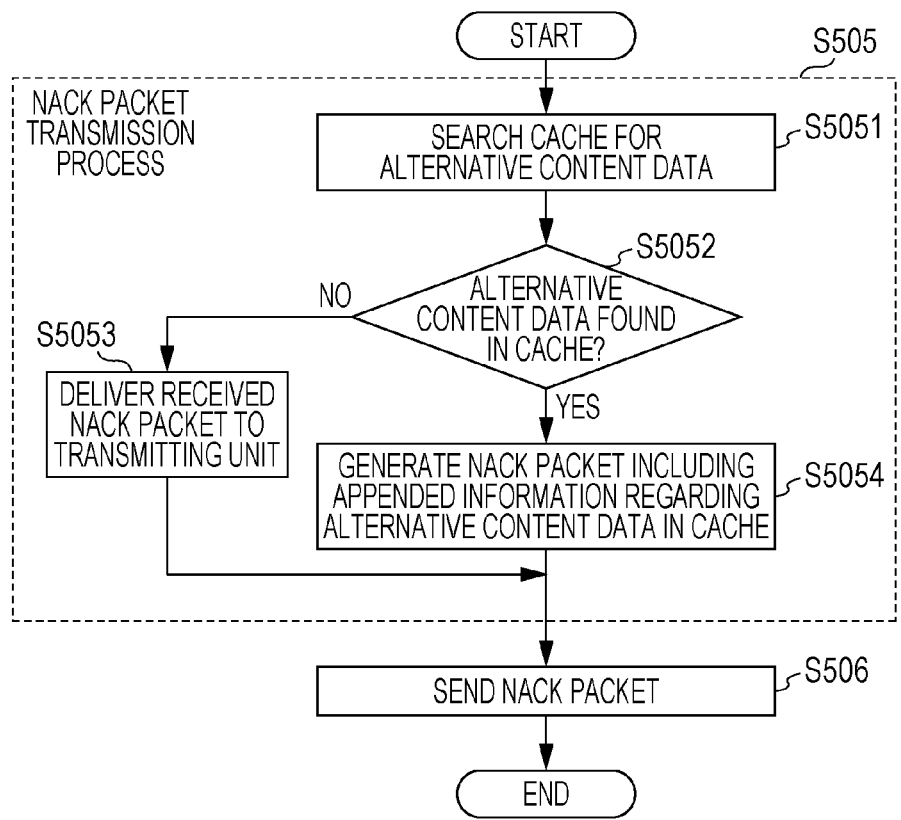
FIG. 15 is a flowchart of a NACK packet issuing process performed by a router according to the second exemplary embodiment.

FIG. 15 is a flowchart of a NACK packet issuing process performed by the router 20 according to the second exemplary embodiment.

The receiving unit 202 of the router 20 receives a NACK packet first. Thereafter, the processing proceeds to the NACK packet issuing process illustrated in step S505.

At that time, the NACK packet includes the information regarding the alternative content data in addition to indication of the occurrence of congestion.

In such a case, the alternative content search unit 203 further searches the cache 201 thereof for the alternative content data (step S5051).

Subsequently, the alternative content search unit 203 of the router 20 determines whether alternative content data is found in the cache 201 of the router 20 (step S5052). If any alternative content data is not found (No in step S5052), the alternative content search unit 203 of the router 20 directly delivers the NACK packet to the transmitting unit 206 (step S5053).

However, if, in step S5052, the alternative content data is found in the cache 201 (Yes in step S5052), a NACK packet including the appended information regarding the found alternative content data, such as the name of the found alternative content data, is generated (step S5054).

Thereafter, the transmitting unit 206 of the router 20 sends, to the receiving terminal 10, the NACK packet received in step S5053 or the NACK packet generated in step S5054 (step S506).

Sequence for Entire Process

The sequence for the entire process performed by the content distribution system 200 according to the present exemplary embodiment is described below with reference to FIG. 16.

FIG. 16 is a sequence diagram of the entire process performed by the content distribution system 200 according to the second exemplary embodiment. Note that elements that are the same as illustrated in FIGS. 7, 14, and 15 are given the same reference numerals as those illustrated in FIGS. 7, 14, and 15, and detailed descriptions of the elements are not repeated.

The processes that differ from those in FIGS. 7, 14, and 15 (steps S601 and S602) are described below.

In step S206, if no congestion is detected (i.e., if it is determined that congestion does not occur) (No in step S206), the router 20 receives a NACK packet or a data packet of the content data from the CCN network 40.

In step S601, the router 20 determines the type of packet received. If the router 20 determines that a data packet of the content data (the data packet of the content data detected in step S601) is received, the router 20 sends the data packet to the CCN network 40 (step S601).

However, if, in step S601, the router 20 determines that a NACK packet is received (the NACK packet detected in step S601), the processing proceeds to step S505, where the NACK packet transmission process is performed.

In this manner, the receiving terminal 10 receives, from the CCN network 40, one of the content data requested using the interest packet and the NACK packet.

Effects of Second Exemplary Embodiment

As described above, according to the present exemplary embodiment, a router, a terminal, and a congestion control method for the router and the terminal capable of preventing the delay of distribution of content data caused by congestion can be provided.

More specifically, upon receiving a NACK packet including the information regarding the alternative content data stored in another router, the router 20 sets, in the NACK packet, the information regarding the alternative content data that is present in the cache 201 thereof and send the NACK packet to the receiving terminal 10. Thus, the receiving terminal 10 can change the content data to be received to one of the alternative content data. In this manner, when congestion occurs, the router 20 allows the receiving terminal 10 to uninterruptedly acquire the content data (the alternative content data) without generating traffic in the link currently experiencing congestion.

Note that according to the second exemplary embodiment, the operation performed by the router 20 when the router 20 receives a NACK packet including the information regarding the alternative content data stored in another router has been described. Note that, since the NACK packet received by the router 20 is a reply packet in response to the interest packet sent from the receiving terminal 10, the NACK packet originally includes the information regarding the name included in the interest packet (refer to FIGS. 9A to 9E). Accordingly, when another router detects congestion and if the router does not have the alternative content data in the cache thereof, the router sends a NACK packet including the information regarding the content data corresponding to the name included in the interest packet. In this case, the router 20 can search the cache 201 for the alternative content data using the information regarding the content data included in the received NACK packet. If the alternative content data is found in the cache 201, the router 20 can set the information regarding the alternative content data in the NACK packet to generate a new NACK packet.

That is, according to the congestion control method of the present exemplary embodiment, in addition to bypassing a link of the network experiencing congestion and preventing delay of real-time distribution of the content data, the congestion can be quickly recovered.

Note that in the NACK packet, the information regarding each of the first alternative content data and the second alternative content data may include the information regarding the distance from, for example, the receiving terminal 10 that sends the interest packet to the router 20. In addition, the information indicating the distance may be the number of hops representing the number of routers through which the interest packet passes from the terminal that sends the interest packet to the router. In such a case, the NACK packet generating unit 205 of the router 20 may set, in the information regarding the alternative content data found in the cache 201 of the router 20, a value "1" as information indicating the distance. In addition, the NACK packet generating unit 205 may add "1" to the information indicating the distance included in the information regarding the alternative content data found in the cache of a router other than the router 20.

Note that in the structure of a NACK packet illustrated in FIGS. 10A to 11E, the information indicating the distance can be included in, for example, the field indicating the information regarding the alternative content data or the field indicating the selector section.

In this manner, when determining a change from the content data to be requested to one of a plurality of the alternative content data, the receiving terminal 10 can select, for example, the alternative content data stored in the cache of a router that is the closest to the receiving terminal 10 in order to acquire the content data in the shortest time possible.

As described above, according to the present disclosure, a router, a terminal, and a congestion control method capable of preventing the delay of distribution of content data caused by congestion can be provided.

While a device, a device management apparatus, a relaying apparatus, and a terminal device according to at least one aspect of the present disclosure have been described with reference to the exemplary embodiments, the present disclosure is not limited to the exemplary embodiments. That is, the scope of at least one aspect of the present disclosure can encompass a variety of modifications made to the present exemplary embodiments that those skilled in the art can conceive and embodiments achieved by combining the constituent elements of the different embodiments.

For example, the following configurations can be encompassed within the scope of present disclosure.

(1) More specifically, each of the above-described server, router, and terminal (hereinafter referred to as "apparatuses") is a computer system including a microprocessor, a read only memory (ROM), a random access memory (RAM), a hard disk unit, a display unit, a keyboard, and a mouse. The RAM or the hard disk unit stores a computer program. Each of the apparatuses can provide the function thereof using the microprocessor that operates in accordance with the computer program. The computer program is a combination of a plurality of instruction codes for the computer.

(2) Some or all of constituent elements of each of the above-described apparatuses may be formed from a single system large scale integration (LSI). The system LSI is a super multifunctional LSI produced by integrating a plurality of constituent units into a chip. More specifically, the system LSI is a computer system including a microprocessor, a ROM, and a RAM. The RAM stores the computer program. The system LSI can provide the function thereof using the microprocessor that operates in accordance with the computer program.

(3) Some or all of constituent elements of each of the above-described apparatuses may be formed from an IC card or a stand-alone module that is removable from the apparatus. Each of the IC card and the stand-alone module may include the above-described super multifunctional LSI. Each of the IC card and the stand-alone module can provide the function thereof using the microprocessor that operates in accordance with the computer program. Each of the IC card and the stand-alone module may be tamper resistant.

(4) The present disclosure may be the above-described method. In addition, the present disclosure may be a computer program that realizes the method using a computer. In addition, the present disclosure may be a digital signal formed from the computer program.

In addition, the present disclosure may be a computer-readable recording medium that can read the computer program or the digital signal. Examples of the computer-readable recording medium include a flexible disk, a hard disk, a Compact Disc Read Only Memory (CD-ROM), a magneto-optical disk (MO), a Digital Versatile Disc (DVD), a Digital Versatile Disc-Read Only Memory (DVD-ROM), a Digital Versatile Disc-Random Access Memory (DVD-RAM), a Blu-ray® disk (BD), and a semiconductor memory. In addition, the present disclosure may be the digital signal stored in one of these recording media.

In addition, in the present disclosure, the above-described computer program or digital signal may be transmitted via, for example, an electric communication network, wired or wireless communication network, a network represented by the Internet, or a data broadcast.

In addition, the present disclosure may be a computer system including a microprocessor and a memory. The memory may store the computer program, and the microprocessor may operate in accordance with the computer program.

In addition, by recording the above-described program or digital signal in the above-described recording medium and transferring the recording medium or transferring the above-described program or digital signal via, for example, the above-described network, the present disclosure may be achieved by another independent computer system.

(5) The above-described embodiments and the above-described modifications may be combined with one another.

The present disclosure is applicable to a router, a terminal, and a congestion control method for the router and the terminal and is applicable to a router, a terminal, and a congestion control method for the router and the terminal connected to a content-oriented network.

What is claimed is:

1. A congestion control method for use in a router connected to a content-oriented network, comprising:
   determining whether congestion occurs by monitoring the content-oriented network;
   receiving an interest packet including a name of content data that is requested to be sent;
   generating a first NACK packet indicating an occurrence of congestion if it is determined that the congestion occurs when the interest packet is received; and
   sending the first NACK packet to the content-oriented network,
   wherein in the generating of the first NACK packet, if first alternative content data which is an alternative of content data corresponding to a name included in the received interest packet is stored in a cache of the router, information regarding the first alternative content data is set in the first NACK packet, and
   wherein at least one of the determining whether the congestion occurs, the receiving the interest packet, the generating of the first NACK packet, and the sending of the first NACK packet is performed by a processor of the router,
   the congestion control method further comprising:
   receiving a second NACK packet that further includes one of information regarding the content data corresponding to the name included in the received interest packet and information regarding second alternative content data which is an alternative of the content data and that indicates the occurrence of congestion,
wherein in the generating of the first NACK packet, if the first alternative content data is stored in the cache of the router, the first NACK packet is generated by additionally setting the information regarding the first alternative content data in the second NACK packet.

2. The congestion control method according to claim 1, further comprising:
searching the cache for the first alternative content data which is an alternative of content data corresponding to the name included in the interest packet if it is determined that congestion occurs.

3. The congestion control method according to claim 1, wherein when the router forwards the received interest packet, the determination as to whether congestion occurs in the content-oriented network is made by monitoring the content-oriented network.

4. The congestion control method according to claim 1, wherein the information regarding the first alternative content data is information regarding content data that is the same as or similar to the content data corresponding to the name included in the received interest packet.

5. The congestion control method according to claim 1, wherein each of the information regarding the content data, the information regarding the first alternative content data, and the information regarding the second alternative content data includes the main name of a corresponding content data and information regarding a property of the corresponding content data.

6. The congestion control method according to claim 5, wherein each of the name included in the interest packet, the information regarding the content data, the information regarding the first alternative content data, and the information regarding the second alternative content data includes at least one of a number string and a character string and is expressed in a hierarchical structure.

7. The congestion control method according to claim 1, wherein each of the information regarding the first alternative content data and the information regarding the second alternative content data further includes information regarding a distance from a terminal that has sent the interest packet and the router.

8. The congestion control method according to claim 7, wherein the information regarding a distance is a number of hops representing a number of routers through which the interest packet passes from a terminal that generates the interest packet and sends the interest packet to the router, and
wherein in the generating of the first NACK packet, a value of 1 is input to the information regarding the first alternative content data stored in the cache of the router as the information regarding the distance, and a value of 1 is added to the information regarding the distance included in the information regarding the second alternative content data stored in a cache of a router other than the router.

9. The congestion control method according to claim 1, wherein the content-oriented network includes a Content Centric Network (CCN).

10. A router connected to a content-oriented network, comprising:
a cache that stores content data;
a receiver that receives an interest packet including a name of content data that is requested to be sent;
a network monitor that determines whether congestion occurs by monitoring the content-oriented network;
a NACK packet generator that generates a first NACK packet indicating an occurrence of congestion if it is determined that the congestion occurs when the interest packet is received; and
a transmitter that sends the first NACK packet,
wherein if alternative content data that is an alternative of content data corresponding to a name included in the interest packet is stored in the cache, the NACK packet generator sets information regarding the alternative content data in the first NACK packet,
wherein at least one of the receiver, the network monitor, the NACK packet generator, and the transmitter includes a processor,
wherein the receiver receives a second NACK packet that further includes one of information regarding the content data corresponding to the name included in the received interest packet and information regarding second alternative content data which is an alternative of the content data and that indicates the occurrence of congestion, and
wherein, if the first alternative content data is stored in the cache of the router, the NACK packet generator generates the first NACK packet by additionally setting the information regarding the first alternative content data in the second NACK packet.

11. A congestion control method for use in a router connected to a content-oriented network, comprising:
determining whether congestion occurs by monitoring the content-oriented network;
receiving an interest packet including a name of content data that is requested to be sent;
generating a first NACK packet indicating an occurrence of congestion if it is determined that the congestion occurs when the interest packet is received; and
sending the first NACK packet to the content-oriented network,
wherein in the generating of the first NACK packet, if first alternative content data which is an alternative of content data corresponding to a name included in the received interest packet is stored in a cache of the router, information regarding the first alternative content data is set in the first NACK packet,
wherein at least one of the determining whether the congestion occurs, the receiving the interest packet, the generating of the first NACK packet, and the sending of the first NACK packet is performed by a processor of the router, and
wherein the name included in the interest packet includes a main name of the content data corresponding to the name and information regarding a bit rate of the content data, and the information regarding the first alternative content data includes information indicating that the first alternative content data has a main name that is the same as the main name of the content data corresponding to the name included in the interest packet and has a bit rate that differs from the bit rate included in the name included in the interest packet.

12. The congestion control method according to claim 11, wherein the information regarding the first alternative content data includes information indicating that the first alternative content data has a main name that is the same as the main name of the content data corresponding to the name included in the interest packet and has a bit rate that is higher than the bit rate included in the name included in the interest packet.

13. A router connected to a content-oriented network, comprising:
- a cache that stores content data;
- a receiver that receives an interest packet including a name of content data that is requested to be sent;
- a network monitor that determines whether congestion occurs by monitoring the content-oriented network;
- a NACK packet generator that generates a first NACK packet indicating an occurrence of congestion if it is determined that the congestion occurs when the interest packet is received; and
- a transmitter that sends the first NACK packet,
- wherein if alternative content data that is an alternative of content data corresponding to a name included in the interest packet is stored in the cache, the NACK packet generator sets information regarding the alternative content data in the first NACK packet,
- wherein at least one of the receiver, the network monitor, the NACK packet generator, and the transmitter includes a processor, and
- wherein the name included in the interest packet includes a main name of the content data corresponding to the name and information regarding a bit rate of the content data, and the information regarding the first alternative content data includes information indicating that the first alternative content data has a main name that is the same as the main name of the content data corresponding to the name included in the interest packet and has a bit rate that differs from the bit rate included in the name included in the interest packet.

* * * * *